(12) United States Patent
Kawamura et al.

(10) Patent No.: US 9,902,843 B2
(45) Date of Patent: Feb. 27, 2018

(54) POLYAMIDE RESIN COMPOSITION AND MOLDED PRODUCT

(71) Applicant: ASAHI KASEI CHEMICALS CORPORATION, Tokyo (JP)

(72) Inventors: Tomoyo Kawamura, Tokyo (JP); Masashi Okamoto, Tokyo (JP); Yasukazu Shikano, Tokyo (JP); Katsushi Watanabe, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 15/021,979

(22) PCT Filed: Sep. 24, 2014

(86) PCT No.: PCT/JP2014/075281
§ 371 (c)(1),
(2) Date: Mar. 15, 2016

(87) PCT Pub. No.: WO2015/046247
PCT Pub. Date: Apr. 2, 2015

(65) Prior Publication Data
US 2016/0222196 A1    Aug. 4, 2016

(30) Foreign Application Priority Data

Sep. 27, 2013  (JP) ................. 2013-202041
Oct. 21, 2013  (JP) ................. 2013-218533
Aug. 22, 2014  (JP) ................. 2014-169802

(51) Int. Cl.
| | | |
|---|---|---|
| *C08K 3/10* | (2006.01) | |
| *C08K 13/06* | (2006.01) | |
| *C08K 3/00* | (2018.01) | |
| *C08K 3/22* | (2006.01) | |
| *C08L 77/06* | (2006.01) | |
| *C08K 3/16* | (2006.01) | |
| *C08K 5/00* | (2006.01) | |
| *C08K 5/098* | (2006.01) | |
| *C08K 3/24* | (2006.01) | |
| *C08K 7/14* | (2006.01) | |
| *C08K 5/20* | (2006.01) | |
| *C08K 5/3435* | (2006.01) | |
| *C08K 5/526* | (2006.01) | |
| *C08G 69/26* | (2006.01) | |

(52) U.S. Cl.
CPC ............ *C08K 13/06* (2013.01); *C08G 69/265* (2013.01); *C08K 3/00* (2013.01); *C08K 3/16* (2013.01); *C08K 3/22* (2013.01); *C08K 3/24* (2013.01); *C08K 5/005* (2013.01); *C08K 5/098* (2013.01); *C08K 5/20* (2013.01); *C08K 5/3435* (2013.01); *C08K 5/526* (2013.01); *C08K 7/14* (2013.01); *C08L 77/06* (2013.01); *C08K 2003/2227* (2013.01); *C08L 2205/025* (2013.01); *C08L 2205/06* (2013.01)

(58) Field of Classification Search
None
See application file for complete search history.

(56) References Cited

U.S. PATENT DOCUMENTS

| | | |
|---|---|---|
| 6,441,072 B1 | 8/2002 | Havenith et al. |
| 2006/0142443 A1 | 6/2006 | Aramaki et al. |
| 2006/0155034 A1 | 7/2006 | Gijsman et al. |
| 2008/0146717 A1 | 6/2008 | Gijsman et al. |
| 2009/0069471 A1 | 3/2009 | Terada et al. |
| 2011/0028628 A1 | 2/2011 | Martens et al. |
| 2014/0288224 A1 | 9/2014 | Gijsman et al. |

FOREIGN PATENT DOCUMENTS

| | | |
|---|---|---|
| CA | 2788267 A1 | 9/2011 |
| JP | 549-116151 A | 11/1974 |
| JP | H10-324800 A | 12/1998 |
| JP | 2004-043812 A | 2/2004 |
| JP | 2004-091778 A | 3/2004 |
| JP | 2005-187552 A | 7/2005 |

(Continued)

OTHER PUBLICATIONS

Machine translation of JP 2010/248324 A, dated Nov. 4, 2010, pp. 1-5.*
International Search Report issued with respect to application No. PCT/JP2014/075281, dated Dec. 16, 2014.
International Preliminary Report on Patentability issued with respect to application No. PCT/JP2014/075281, dated Mar. 29, 2016.
European Search Report issued with respect to Application No. 14849142.6, dated Aug. 1, 2016.

*Primary Examiner* — Robert T Butcher
(74) *Attorney, Agent, or Firm* — Greenblum & Bernstein, P.L.C.

(57) ABSTRACT

A polyamide resin composition includes:
(A) a polyamide resin;
(B) an aluminic acid metal salt; and
(C) at least one or more compounds selected from the group consisting of the following (C1) to (C3):
 (C1) a salt of one or more metal elements selected from the group consisting of groups 3, 4, 11, 13, and 14 of the periodic table,
 (C2) at least one organic heat stabilizer selected from the group consisting of a hindered phenol compound, a hindered amine compound, and an organic phosphorus compound, and
 (C3) a crystalline thermoplastic resin having a lower melting point than that of the component (A) and/or an amorphous thermoplastic resin having a lower Vicat softening point than that of the component (A), and
wherein the content of the component (B) is 0.03 to 20 parts by mass with respect to 100 parts by mass in total of the component (A) and the component (C3).

20 Claims, No Drawings

(56) References Cited

FOREIGN PATENT DOCUMENTS

| | | |
|---|---|---|
| JP | 2005-194465 A | 7/2005 |
| JP | 2005-206662 A | 8/2005 |
| JP | 2005-281616 A | 10/2005 |
| JP | 2006-316244 A | 11/2006 |
| JP | 2008-007563 A | 1/2008 |
| JP | 2008-527127 A | 7/2008 |
| JP | 2008-527129 A | 7/2008 |
| JP | 2010/248324 A * | 11/2010 |
| JP | 2010-270318 A | 12/2010 |
| WO | 2006-112058 A1 | 10/2006 |
| WO | 2015-125886 A1 | 8/2015 |

* cited by examiner

POLYAMIDE RESIN COMPOSITION AND MOLDED PRODUCT

TECHNICAL FIELD

The present invention relates to a polyamide resin composition and a molded product.

BACKGROUND ART

Polyamide resins are excellent in strength, heat resistance, and chemical resistance and is excellent in specific gravity, i.e., has a smaller specific gravity than that of metals. Therefore, the polyamide resins have heretofore been used as alternative materials for metals in automobile mechanical parts, etc.

Particularly, members around engines are required to have durability in a high-temperature environment. Therefore, various polyamide resin compositions excellent in heat aging resistance have been proposed (see e.g., Patent Literatures 1 and 2).

In the present specification, the "heat aging resistance" refers to resistance to so-called thermal oxidation, by which a molded product can maintain practically sufficient mechanical characteristics and has only a little color change when left for a long time in an air atmosphere under high-temperature conditions equal to or lower than the melting point with the shape of the molded product maintained.

In recent years, the downsizing of automobiles has been practiced as one approach for improvement in fuel efficiency. As a result, automobile engine room parts tend to have a higher density, and engine rooms tend to have a higher internal ambient temperature.

In addition, higher powers have been imparted to engines with superchargers for improvement in fuel efficiency. Along with this, engine rooms tend to have an increasingly higher ambient temperature.

Thus, there has been a demand for polyamide resins having heat aging resistance over a long period under higher-temperature conditions than ever. Specifically, there has been a growing demand for durable materials that can maintain practically sufficient mechanical characteristics and have only a little color change even when used for a long time in an air atmosphere under high-temperature conditions of 150° C. to 230° C.

A technique which involves adding a copper compound (an oxide or a salt of copper) is known as a technique for improving the heat aging resistance of polyamide resins.

Likewise, a technique which involves mixing a copper compound and iron oxide with 2 types of polyamides differing in melting point (see e.g., Patent Literature 3), a technique which involves mixing fine particles of element iron with polyamide (see e.g., Patent Literature 4), and a technique which involves mixing a fine dispersed metal powder with polyamide (see e.g., Patent Literature 5) are disclosed as techniques for improving the heat aging resistance.

Meanwhile, a polyamide resin composition containing sodium aluminate and a method for producing the same are disclosed (see e.g., Patent Literatures 6 to 12).

The polyamide resin composition containing sodium aluminate has heretofore been known to have excellent heat retention stability.

The "heat retention stability" refers to characteristics by which the resin is less decomposed and deteriorated when the polyamide resin composition is kept at a temperature equal to or higher than the melting point and is thereby in a melted state, and consequently, reduction in mechanical physical properties or color change of the polyamide resin composition caused by the action of keeping it at the temperature equal to or higher than the melting point is prevented.

Also, a technique which involves adding a resin having a lower melting point and a heat stabilizer to a polyamide resin is disclosed (see e.g., Patent Literature 13).

CITATION LIST

Patent Literature

Patent Literature 1: National Publication of International Patent Application No. 2013-501095
Patent Literature 2: National Publication of International Patent Application No. 2013-521393
Patent Literature 3: National Publication of International Patent Application No. 2008-527129
Patent Literature 4: National Publication of International Patent Application No. 2006-528260
Patent Literature 5: National Publication of International Patent Application No. 2008-527127
Patent Literature 6: Japanese Patent Laid-Open No. 2005-206662
Patent Literature 7: Japanese Patent Laid-Open No. 2004-91778
Patent Literature 8: Japanese Patent Laid-Open No. 49-116151
Patent Literature 9: Japanese Patent Laid-Open No. 2008-7563
Patent Literature 10: Japanese Patent Laid-Open No. 2006-316244
Patent Literature 11: Japanese Patent Laid-Open No. 2005-281616
Patent Literature 12: Japanese Patent Laid-Open No. 2004-91778
Patent Literature 13: National Publication of International Patent Application No. 2008-527129

SUMMARY OF INVENTION

Technical Problem

The techniques described in Patent Literatures 1 to 12, however, have failed to yield a polyamide resin composition having a high level of heat aging resistance and have not yet satisfied the requirements for heat aging resistance over a long period under high-temperature conditions.

Thus, an object of the present invention is to provide, in light of the aforementioned problems of the conventional techniques, a polyamide resin composition having a high level of heat aging resistance and a molded product thereof.

Solution to Problem

The present inventors have conducted diligent studies to attain the object and consequently found that a polyamide resin composition containing a polyamide resin, a aluminic acid metal salt, and a predetermined compound in their respective predetermined amounts has a high level of heat aging resistance, i.e., can effectively suppress oxidative degradation at the melting point or lower.

Specifically, the present invention is as follows:

[1] A polyamide resin composition comprising:
(A) a polyamide resin;
(B) an aluminic acid metal salt; and
(C) at least one or more compounds selected from the group consisting of the following (C1) to (C3):
(C1) a salt of one or more metal elements selected from the group consisting of groups 3, 4, 11, 13, and 14 of a periodic table;
(C2) at least one organic heat stabilizer selected from the group consisting of a hindered phenol compound, a hindered amine compound, and an organic phosphorus compound; and
(C3) a crystalline thermoplastic resin having a lower melting point than that of the component (A) and/or an amorphous thermoplastic resin having a lower Vicat softening point than that of the component (A), and
wherein a content of the component (B) is 0.03 to 20 parts by mass with respect to 100 parts by mass in total of the component (A) and the component (C3), and
the components (C1) to (C3) have the following respective contents when selected as a component contained therein:
component (C1): 0.001 to 0.05 parts by mass in terms of an amount of the metal element;
component (C2): 0.8 to 20 parts by mass; and
component (C3): 1 to 50 parts by mass.

[2]
The polyamide resin composition according to [1], wherein the compound (C) is a combination of at least two or more selected from the group consisting of the components (C1) to (C3).

[3]
The polyamide resin composition according to [1] or [2], wherein the polyamide resin (A) is a polyamide resin having a melting point of 240° C. or higher.

[4]
The polyamide resin composition according to any one of [1] to [3], wherein the polyamide resin (A) is polyamide 66.

[5]
The polyamide resin composition according to any one of [1] to [4], wherein the aluminic acid metal salt (B) is sodium aluminate.

[6]
The polyamide resin composition according to any one of [1] to [5], wherein the content of the component (B) is 0.1 to 20 parts by mass with respect to 100 parts by mass in total of the component (A) and the component (C3).

[7]
The polyamide resin composition according to any one of [1] to [5], wherein
the content of the component (B) is 0.5 to 20 parts by mass with respect to 100 parts by mass in total of the component (A) and the component (C3).

[8]
The polyamide resin composition according to any one of [1] to [7], further comprising (D) an inorganic filler other than the aluminic acid metal salt.

[9]
The polyamide resin composition according to [8], wherein a content of the component (D) is 10 to 250 parts by mass with respect to 100 parts by mass in total of the component (A) and the component (C3).

[10]
The polyamide resin composition according to any one of [1] to [9], wherein the component (C) comprises at least the component (C1).

[11]
The polyamide resin composition according to any one of [1] to [10], wherein the component (C1) is a copper salt.

[12]
The polyamide resin composition according to any one of [1] to [10], wherein the component (C1) is a copper halide and/or copper acetate.

[13]
The polyamide resin composition according to any one of [1] to [12], wherein the content of the component (C1) is 0.003 to 0.05 parts by mass in terms of the amount of the metal element with respect to 100 parts by mass in total of the component (A) and the component (C3).

[14]
The polyamide resin composition according to any one of [1] to [13], wherein a mass ratio (B)/(C1) of the component (B) to the component (C1) is 1 or more.

[15]
The polyamide resin composition according to any one of [10] to [14], further comprising (C1-2) a halide of an alkali metal and/or a halide of an alkaline earth metal.

[16]
The polyamide resin composition according to [15], wherein a molar ratio of a halogen element of the component (C1-2) to the metal element of the component (C1) (halogen element/metal element) is 2 to 50.

[17]
The polyamide resin composition according to any one of [1] to [16], wherein the component (C) comprises at least the component (C2).

[18]
The polyamide resin composition according to any one of [1] to [17], wherein the component (C2) is a hindered phenol compound.

[19]
The polyamide resin composition according to [17] or [18], wherein the content of the component (C2) is 1 to 10 parts by mass with respect to 100 parts by mass in total of the component (A) and the component (C3).

[20]
The polyamide resin composition according to any one of [1] to [19], wherein the component (C) comprises at least the component (C3).

[21]
The polyamide resin composition according to any one of [1] to [20], wherein the content of the component (C3) is 5 to 50 parts by mass with respect to 100 parts by mass in total of the component (A) and the component (C3).

[22]
The polyamide resin composition according to any one of [1] to [21], wherein the component (C3) is a polyamide resin having a melting point of lower than 240° C.

[23]
The polyamide resin composition according to any one of [1] to [22], wherein the component (C3) is polyamide 6.

[24]
The polyamide resin composition according to any one of [1] to [22], wherein the component (C3) is a polyamide resin in which a ratio of number of carbon atoms to number of nitrogen atoms (C/N) contained in the component (C3) is 7 or more and 20 or less.

[25]
A molded product comprising a polyamide resin composition according to any one of [1] to [24].

[26]
A material part for automobiles comprising a polyamide resin composition according to any one of [1] to [24].

[27]
Use of sodium aluminate for producing a molded polyamide product having heat aging resistance.

Advantageous Effects of Invention

The present invention can provide a polyamide resin composition excellent in heat aging resistance and a molded product thereof.

DESCRIPTION OF EMBODIMENTS

Hereinafter, an embodiment for carrying out the present invention (hereinafter, simply referred to as the "present embodiment") will be described in detail.

The present embodiment described below is given merely for the purpose of illustrating the present invention and is not intended to limit the present invention by the contents described below. The present invention can be appropriately changed or modified within the scope of the gist thereof.

[Polyamide Resin Composition]

The polyamide resin composition of the present embodiment comprises:
 (A) a polyamide resin;
 (B) an aluminic acid metal salt; and
 (C) at least one or more compounds selected from the group consisting of the following (C1) to (C3):
   (C1) a salt of one or more metal elements selected from the group consisting of groups 3, 4, 11, 13, and 14 of the periodic table,
   (C2) at least one organic heat stabilizer selected from the group consisting of a hindered phenol compound, a hindered amine compound, and an organic phosphorus compound; and
   (C3) a crystalline thermoplastic resin having a lower melting point than that of the component (A) and/or an amorphous thermoplastic resin having a lower Vicat softening point than that of the component (A), and
 wherein the content of the component (B) is 0.03 to 20 parts by mass with respect to 100 parts by mass in total of the component (A) and the component (C3), and
 the components (C1) to (C3) have the following respective contents when selected as a component contained therein:
   component (C1): 0.001 to 0.05 parts by mass in terms of the amount of the metal element;
   component (C2): 0.8 to 20 parts by mass; and
   component (C3): 1 to 50 parts by mass.

The polyamide resin composition of the present embodiment having the aforementioned composition can exert excellent heat aging resistance.

Hereinafter, each constituent of the polyamide resin composition according to the present embodiment will be described in detail.

((A) Polyamide Resin)

The polyamide resin composition of the present embodiment contains (A) a polyamide resin (hereinafter, also referred to as a "component (A)"). The "polyamide resin" is a polymer having amide bonds (—NHCO—) in the backbone.

Examples of the polyamide resin include, but are not limited to, a polyamide resin obtained by the condensation polymerization of a diamine and a dicarboxylic acid, a polyamide resin obtained by the ring-opening polymerization of a lactam, a polyamide resin obtained by the self-condensation of an aminocarboxylic acid, and a copolymer obtained by the copolymerization of two or more types of monomers constituting these polyamide resins.

Only one of these polyamide resins may be used alone as the polyamide resin (A), or two or more thereof may be used in combination.

Hereinafter, the starting materials for the polyamide resin will be described.

<Diamine>

Examples of the diamine include, but are not limited to, aliphatic diamines, alicyclic diamines, and aromatic diamines.

Examples of the aliphatic diamines include, but are not limited to: linear saturated aliphatic diamines each having 2 to 20 carbon atoms such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine; and branched saturated aliphatic diamines each having 3 to 20 carbon atoms such as 2-methylpentamethylenediamine (also referred to as 2-methyl-1,5-diaminopentane), 2,2,4-trimethylhexamethylenediamine, 2,4,4-trimethylhexamethylenediamine, 2-methyloctamethylenediamine, and 2,4-dimethyloctamethylenediamine. Examples of the branched saturated aliphatic diamines include diamines having a substituent branched from the backbone.

Examples of the alicyclic diamines include, but are not limited to, 1,4-cyclohexanediamine, 1,3-cyclohexanediamine, and 1,3-cyclopentanediamine.

Examples of the aromatic diamines include, but are not limited to, m-xylylenediamine, p-xylylenediamine, m-phenylenediamine, o-phenylenediamine, and p-phenylenediamine.

<Dicarboxylic Acid>

Examples of the dicarboxylic acid include, but are not limited to, aliphatic dicarboxylic acids, alicyclic dicarboxylic acids, and aromatic dicarboxylic acids.

Examples of the aliphatic dicarboxylic acids include, but are not limited to, linear or branched saturated aliphatic dicarboxylic acids each having 3 to 20 carbon atoms such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyladipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

Examples of the alicyclic dicarboxylic acids include, but are not limited to, alicyclic dicarboxylic acids such as 1,4-cyclohexanedicarboxylic acid, 1,3-cyclohexanedicarboxylic acid, and 1,3-cyclopentanedicarboxylic acid.

The number of carbon atoms in the alicyclic structure of each alicyclic carboxylic acid is not particularly limited and is preferably 3 to 10, more preferably 5 to 10, from the viewpoint of the balance between the water absorbability and the degree of crystallinity of the resulting polyamide resin.

The alicyclic dicarboxylic acid may be unsubstituted or may have a substituent.

Examples of the substituent include, but are not limited to, alkyl groups each having 1 to 4 carbon atoms such as a methyl group, an ethyl group, a n-propyl group, an isopropyl group, a n-butyl group, an isobutyl group, and a tert-butyl group.

Examples of the aromatic dicarboxylic acids include, but are not limited to, aromatic dicarboxylic acids each having 8 to 20 carbon atoms unsubstituted or substituted by a substituent.

Examples of the substituent include, but are not limited to, alkyl groups each having 1 to 6 carbon atoms, aryl groups each having 6 to 12 carbon atoms, arylalkyl groups each having 7 to 20 carbon atoms, halogen groups such as a chloro group and a bromo group, alkylsilyl groups each having 3 to 10 carbon atoms, sulfonic acid groups, and groups which are salts (e.g., sodium salt) thereof.

Examples of the aromatic dicarboxylic acids include, but are not limited to, terephthalic acid, isophthalic acid, naphthalenedicarboxylic acid, 2-chloroterephthalic acid, 2-methylterephthalic acid, 5-methylisophthalic acid, and 5-sodium sulfoisophthalic acid.

The dicarboxylic acids may further include trivalent or higher polyvalent carboxylic acids such as trimellitic acid, trimesic acid, and pyromellitic acid without impairing the object of the present embodiment.

Only one of these diamines or dicarboxylic acids may be used alone, or two or more thereof may be used in combination.

<Lactam>

Examples of the lactam include, but are not limited to, butyrolactam, pivalolactam, ε-caprolactam, caprylolactam, enantholactam, undecanolactam, and laurolactam (dodecanolactam).

Among them, ε-caprolactam, laurolactam, or the like is preferred, and ε-caprolactam is more preferred, from the viewpoint of tenacity.

<Aminocarboxylic Acid>

Examples of the aminocarboxylic acid include, but are not limited to, compounds obtained by the ring-opening of the aforementioned lactam (ω-aminocarboxylic acid, α,ω-aminocarboxylic acid, etc.).

The aminocarboxylic acid is preferably a linear or branched saturated aliphatic carboxylic acid having 4 to 14 carbon atoms substituted at the ω position by an amino group from the viewpoint of enhancing the degree of crystallinity. Examples thereof include, but are not limited to, 6-aminocaproic acid, 11-aminoundecanoic acid, and 12-aminododecanoic acid. Another example of the aminocarboxylic acid includes p-aminomethylbenzoic acid.

Examples of the aforementioned polyamide resin (A) include, but are not limited to, polyamide resins such as polyamide 4 (poly-α-pyrrolidone), polyamide 6 (polycaproamide), polyamide 11 (polyundecanamide), polyamide 12 (polydodecanamide), polyamide 46 (polytetramethylene adipamide), polyamide 56 (polypentamethylene adipamide), polyamide 66 (polyhexamethylene adipamide), polyamide 610 (polyhexamethylene sebacamide), polyamide 612 (polyhexamethylene dodecamide), polyamide 116 (polyundecamethylene adipamide), polyamide TMHT (trimethylhexamethylene terephthalamide), polyamide 6T (polyhexamethylene terephthalamide), polyamide 2Me-5T (poly-2-methylpentamethylene terephthalamide), polyamide 9T (polynonamethylene terephthalamide), polyamide 2Me-8T (poly-2-methyloctamethylene terephthalamide), polyamide 6I (polyhexamethylene isophthalamide), polyamide 6C (polyhexamethylene cyclohexane dicarboxamide), polyamide 2Me-5C (poly-2-methylpentamethylene cyclohexane dicarboxamide), polyamide 9C (polynonamethylene cyclohexane dicarboxamide), polyamide 2Me-8C (poly-2-methyloctamethylene cyclohexane dicarboxamide), polyamide PACM12 (polybis(4-aminocyclohexyl)methane dodecamide), polyamide dimethyl PACM12 (polybis(3-methyl-aminocyclohexyl)methane dodecamide, polyamide MXD6 (poly-m-xylylene adipamide), polyamide 10T (polydecamethylene terephthalamide), polyamide 11T (polyundecamethylene terephthalamide), polyamide 12T (polydodecamethylene terephthalamide), polyamide 10C (polydecamethylene cyclohexane dicarboxamide), polyamide 11C (polyundecamethylene cyclohexane dicarboxamide), and polyamide 12C (polydodecamethylene cyclohexane dicarboxamide).

The symbol "Me" represents a methyl group.

The polyamide resin (A) in the polyamide resin composition of the present embodiment is preferably polyamide 46 (polytetramethylene adipamide), polyamide 66 (polyhexamethylene adipamide), polyamide 610, polyamide 612, polyamide 6T (polyhexamethylene terephthalamide), polyamide 9T (polynonamethylene terephthalamide), polyamide 6I (polyhexamethylene isophthalamide), or polyamide MXD6 (poly-m-xylylene adipamide), or copolymerized polyamide containing these polyamide resins as constituents.

Particularly, the polyamide resin (A) is preferably polyamide 66 from the viewpoint of improvement in heat aging resistance.

The melting point of the polyamide resin (A) used in the polyamide resin composition of the present embodiment is not particularly limited and is preferably 200° C. or higher, more preferably 210° C. or higher, further preferably 240° C. or higher.

The melting point of the polyamide resin (A) is set to a value equal to or higher than the lower limit described above, whereby the polyamide resin composition of the present embodiment tends to have improved heat resistance.

The melting point of the polyamide resin (A) according to the present embodiment is not particularly limited and is preferably 340° C. or lower. The melting point of the polyamide resin (A) is set to a value equal to or lower than the upper limit described above, whereby the thermal decomposition or degradation of the polyamide resin composition of the present embodiment during melt processing tends to be able to be effectively suppressed.

The melting point of the polyamide resin (A) can be measured according to JIS-K7121. For example, Diamond DSC manufactured by PerkinElmer Inc. can be used as a measurement apparatus. Specifically, the melting point of the polyamide resin (A) can be measured by a method described in Examples mentioned later.

The polyamide resin (A) used in the polyamide resin composition of the present embodiment is preferably contained at 33% by mass or more and 95% by mass or less, more preferably 50% by mass or more and 75% by mass or less, in the polyamide resin composition.

The polyamide resin composition of the present embodiment containing the polyamide resin (A) in the aforementioned range tends to be excellent in strength, heat resistance, chemical resistance, specific gravity, etc.

The relative viscosity in sulfuric acid of the polyamide resin (A) used in the polyamide resin composition of the present embodiment is preferably 1.8 or more and 3.0 or less, more preferably 2.2 or more and 2.8 or less.

The relative viscosity in sulfuric acid is 1.8 or more, whereby the resulting polyamide resin composition tends to have better mechanical physical properties. Also, the relative viscosity in sulfuric acid is 3.0 or less, whereby the resulting polyamide resin composition tends to have better fluidity and appearance.

The relative viscosity in sulfuric acid can be controlled by the adjustment of a polymerization pressure for the polyamide resin (A).

The relative viscosity in sulfuric acid can be measured by a method that abides by JIS K 6920. Specifically, the relative viscosity in sulfuric acid can be measured by a method described in Examples mentioned later.

In the present embodiment, an end-capping agent for molecular weight adjustment can be further added during the polymerization of the monomers of the polyamide resin (A). This end-capping agent is not particularly limited, and any of those known in the art can be used.

Examples of the end-capping agent include, but are not limited to, monocarboxylic acids, monoamines, acid anhydrides such as phthalic anhydride, monoisocyanates, monoacid halides, monoesters, and monoalcohols.

Among them, a monocarboxylic acid or a monoamine is preferred from the viewpoint of the heat stability of the polyamide resin (A).

Only one of these end-capping agents may be used alone, or two or more thereof may be used in combination.

The monocarboxylic acids that can be used as the end-capping agent can be any monocarboxylic acid having reactivity with an amino group. Examples thereof include, but are not limited to: aliphatic monocarboxylic acids such as formic acid, acetic acid, propionic acid, butyric acid, valeric acid, caproic acid, caprylic acid, lauric acid, tridecylic acid, myristic acid, palmitic acid, stearic acid, pivalic acid, and isobutyric acid; alicyclic monocarboxylic acids such as cyclohexanecarboxylic acid; and aromatic monocarboxylic acids such as benzoic acid, toluic acid, α-naphthalenecarboxylic acid, β-naphthalenecarboxylic acid, methylnaphthalenecarboxylic acid, and phenylacetic acid.

Only one of these monocarboxylic acids may be used alone, or two or more thereof may be used in combination.

The monoamines that can be used as the end-capping agent can be any monoamine having reactivity with a carboxyl group. Examples thereof include, but are not limited to: aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine.

Only one of these monoamines may be used alone, or two or more thereof may be used in combination.

Examples of the acid anhydrides that can be used as the end-capping agent include, but are not limited to, phthalic anhydride, maleic anhydride, benzoic anhydride, acetic anhydride, and hexahydrophthalic anhydride.

Only one of these acid anhydrides may be used alone, or two or more thereof may be used in combination.

Examples of the monoisocyanates that can be used as the end-capping agent include, but are not limited to, phenyl isocyanate, tolyl isocyanate, dimethylphenyl isocyanate, cyclohexyl isocyanate, butyl isocyanate, and naphthyl isocyanate.

Only one of these monoisocyanates may be used alone, or two or more thereof may be used in combination.

Examples of the monoacid halides that can be used as the end-capping agent include, but are not limited to, halogen-substituted monocarboxylic acids of monocarboxylic acids such as benzoic acid, diphenylmethanecarboxylic acid, diphenylsulfonecarboxylic acid, diphenyl sulfoxide carboxylic acid, diphenyl sulfide carboxylic acid, diphenyl ether carboxylic acid, benzophenonecarboxylic acid, biphenylcarboxylic acid, α-naphthalenecarboxylic acid, β-naphthalenecarboxylic acid, and anthracenecarboxylic acid.

Only one of these monoacid halides may be used alone, or two or more thereof may be used in combination.

Examples of the monoesters that can be used as the end-capping agent include, but are not limited to, glycerin monopalmitate, glycerin monostearate, glycerin monobehenate, glycerin monomontanate, pentaerythritol monopalmitate, pentaerythritol monostearate, pentaerythritol monobehenate, pentaerythritol monomontanate, sorbitan monopalmitate, sorbitan monostearate, sorbitan monobehenate, sorbitan monomontanate, sorbitan dimontanate, sorbitan trimontanate, sorbitol monopalmitate, sorbitol monostearate, sorbitol monobehenate, sorbitol tribehenate, sorbitol monomontanate, and sorbitol dimontanate.

Only one of these monoesters may be used alone, or two or more thereof may be used in combination.

Examples of the monoalcohols that can be used as the end-capping agent include, but are not limited to, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, docosanol, tricosanol, tetracosanol, hexacosanol, heptacosanol, octacosanol, and triacontanol (all of which include linear and branched alcohols), oleyl alcohol, behenyl alcohol, phenol, cresol (o-, m-, and p-forms), biphenol (o-, m-, and p-forms), 1-naphthol, and 2-naphthol.

Only one of these monoalcohols may be used alone, or two or more thereof may be used in combination.

((B) Aluminic Acid Metal Salt)

The polyamide resin composition of the present embodiment contains (B) an aluminic acid metal salt (hereinafter, also referred to as a "component (B)").

Examples of the aluminic acid metal salt (B) include, but are not limited to, lithium aluminate, sodium aluminate, potassium aluminate, beryllium aluminate, magnesium aluminate, and calcium aluminate. Only one of these aluminic acid metal salts may be used alone as the aluminic acid metal salt (B), or two or more thereof may be used in combination.

The aluminic acid metal salt (B) is preferably an aluminic acid alkali metal salt, more preferably sodium aluminate, from the viewpoint of improving heat aging resistance.

The polyamide resin composition of the present embodiment contains 0.03 parts by mass or more and 20 parts by mass or less of the aluminic acid metal salt (B) with respect to 100 parts by mass in total of the component (A) and the component (C3) which are thermoplastic resin components from the viewpoint of obtaining favorable heat aging resistance and initial strength.

The content of the aluminic acid metal salt (B) is preferably 0.1 parts by mass or more and 20 parts by mass or less, more preferably 0.5 parts by mass or more and 20 parts by mass or less, further preferably 0.6 parts by mass or more and 5 parts by mass or less, still further preferably 0.8 parts by mass or more and 5 parts by mass or less, with respect to 100 parts by mass in total of the component (A) and the component (C3).

In the polyamide resin composition of the present embodiment, the content of aluminic acid metal salt particles having a particle size of 1 μm or larger in the aluminic acid metal salt (B) is preferably 20% by mass or less, more preferably 15% by mass or less, further preferably 10% by mass or less, still further preferably 5% by mass or less.

The content of aluminic acid metal salt particles having a particle size of 1 μm or larger is 20% by mass or less in the component (B), whereby the polyamide resin composition of the present embodiment can provide excellent heat aging resistance.

In this context, the particle size of the aluminic acid metal salt is a particle size of an aluminic acid metal salt present in the polyamide resin composition of the present embodiment.

The particle size of the aluminic acid metal salt in the polyamide resin composition can be measured, for example, by dissolving the polyamide resin composition in formic acid and measuring the particle size using a laser diffraction particle size distribution apparatus.

For controlling the content of aluminic acid metal salt particles having a particle size of 1 μm or larger in the aluminic acid metal salt (B) to 20% by mass or less as described above, it is effective to mix the aluminic acid metal salt (B) with the polyamide resin (A) in a state having a small amount of moisture.

Examples of such a method include a method which involves melt-kneading the aluminic acid metal salt (B) with the polyamide resin (A) using an extruder.

On the other hand, if the aluminic acid metal salt (B) is added during the step for the condensation polymerization of the polyamide resin (A), the particle size of the aluminic acid metal salt (B) might be increased. Specifically, it is preferred to isolate the polyamide resin (A) after the completion of the step for the polymerization of the polyamide resin (A), and mix the component (A) with the component (B) at the stage of melt-kneading, which is the step for producing the polyamide resin composition.

((C) At Least One Compound Selected from Group Consisting of Following (C1) to (C3))

The polyamide resin composition of the present embodiment contains, as a component (C), at least one or more compounds selected from the group consisting of the following (C1) to (C3):

(C1) a salt of one or more metal elements selected from the group consisting of groups 3, 4, 11, 13, and 14 of the periodic table, (C2) at least one organic heat stabilizer selected from the group consisting of a hindered phenol compound, a hindered amine compound, and an organic phosphorus compound, and (C3) a crystalline thermoplastic resin having a lower melting point than that of the component (A) and/or an amorphous thermoplastic resin having a lower Vicat softening point than that of the component (A).

Only one of these compounds may be used alone as the component (C), and two or more thereof are preferably used in combination from the viewpoint of improvement in the heat aging resistance of the polyamide resin composition of the present embodiment.

<(C1) Salt of One or More Metal Elements Selected from Group Consisting of Groups 3, 4, 11, 13, and 14 of Periodic Table>

The polyamide resin composition of the present embodiment preferably contains (C1) a salt of one or more metal elements selected from the group consisting of groups 3, 4, 11, 13, and 14 of the periodic table (hereinafter, also referred to as a component (C1) or simply as (C1)).

The salt of one or more metal elements selected from the group consisting of groups 3, 4, 11, 13, and 14 of the periodic table is not particularly limited as long as the salt is a salt of metal element(s) belonging to these groups.

The salt (C1) of one or more metal elements selected from the group consisting of groups 3, 4, 11, 13, and 14 of the periodic table is preferably a copper salt from the viewpoint of further improving heat aging resistance.

Examples of the copper salt include, but are not limited to, copper halides (copper iodide, copper(I) bromide, copper(II) bromide, copper(I) chloride, etc.), copper acetate, copper propionate, copper benzoate, copper adipate, copper terephthalate, copper isophthalate, copper salicylate, copper nicotinate, and copper stearate, and copper complex salts containing copper coordinated with chelating agents such as ethylenediamine and ethylenediaminetetraacetic acid.

Only one of these copper salts may be used alone, or two or more thereof may be used in combination.

Among the copper salts listed above, one or more selected from the group consisting of copper iodide, copper(I) bromide, copper(II) bromide, copper(I) chloride, and copper acetate are preferred, and copper iodide and/or copper acetate are more preferred.

In the case of using the copper salt as the component (C1), the resulting polyamide resin composition is excellent in heat aging resistance and can effectively suppress the metal corrosion of a screw or cylinder portion during extrusion (hereinafter, also simply referred to as "metal corrosion").

The content of the component (C1) in the polyamide resin composition of the present embodiment when the (C1) is selected as a component contained therein is preferably 0.001 to 0.05 parts by mass as the content based on the metal element in the (C1) with respect to 100 parts by mass in total of the component (A) and the component (C3) which are thermoplastic resins.

The content based on the metal element is more preferably 0.003 to 0.05 parts by mass, further preferably 0.005 to 0.03 parts by mass.

In the case of particularly using the copper salt as the component (C1), the content of the metal element of the copper salt in the polyamide resin composition of the present embodiment is preferably 0.001 to 0.05 parts by mass, more preferably 0.003 to 0.05 parts by mass, further preferably 0.005 to 0.03 parts by mass, with respect to 100 parts by mass in total of the component (A) and the component (C3) which are thermoplastic resins. Within the aforementioned range, heat aging resistance can be further improved while copper deposition or metal corrosion can be effectively suppressed.

The polyamide resin composition of the present embodiment preferably contains 1 part by mass or more of the aluminic acid metal salt (B) with respect to 1 part by mass of the salt (C1) of one or more metal elements selected from the group consisting of groups 3, 4, 11, 13, and 14 of the periodic table, i.e., the mass ratio of the component (B) to the component (C1) ((B)/(C1)) is 1 or more, from the viewpoint of improvement in heat aging resistance.

The content of the component (B) with respect to 1 part by mass of the component (C1) is more preferably 5 parts by mass or more and 500 parts by mass or less, further preferably 15 parts by mass or more and 500 parts by mass or less, still further preferably 25 parts by mass or more and 500 parts by mass or less, still further preferably 35 parts by mass or more and 500 parts by mass or less, particularly preferably 45 parts by mass or more and 500 parts by mass or less, from the viewpoint of better heat aging resistance and productivity.

<(C1-2) Halide of Alkali Metal and/or Halide of Alkaline Earth Metal>

The polyamide resin composition of the present embodiment preferably contains (C1-2) a halide of an alkali metal and/or a halide of an alkaline earth metal (hereinafter, also referred to as a component (C1-2) or simply as (C1-2)).

Examples of the halide of an alkali metal and/or the halide of an alkaline earth metal include, but are not limited to, potassium iodide, potassium bromide, potassium chloride, sodium iodide, and sodium chloride, and mixtures thereof.

Among them, potassium iodide and/or potassium bromide are preferred, and potassium iodide is more preferred, from the viewpoint of improvement in heat aging resistance and the suppression of metal corrosion.

The content of the component (C1-2) in the polyamide resin composition of the present embodiment is preferably 0.05 to 5 parts by mass, more preferably 0.2 to 2 parts by mass, with respect to 100 parts by mass in total of the component (A) and the component (C3) which are thermoplastic resins.

When the content of the component (C1-2) falls within the aforementioned range, heat aging resistance can be further improved while copper deposition or metal corrosion can be effectively suppressed.

Only one of these components (C1) and components (C1-2) may be used alone, or two or more thereof may be used in combination.

Among others, the copper salt used as the component (C1) and the halide of an alkali metal and/or the halide of an alkaline earth metal used as the component (C1-2) are preferably combined and used as a mixture, from the viewpoint of further improving heat aging resistance.

The molar ratio of the halogen element of the component (C1-2) to the metal element of the component (C1) (halogen element/metal element) is preferably 2 to 50, more preferably 2 to 40, further preferably 5 to 30.

Within the aforementioned range, heat aging resistance can be further improved.

<(C2) At Least One Organic Heat Stabilizer Selected from Group Consisting of Hindered Phenol Compound, Hindered Amine Compound, and Organic Phosphorus Compound>

The polyamide resin composition of the present embodiment preferably contains (C2) at least one organic heat stabilizer selected from the group consisting of a hindered phenol compound, a hindered amine compound, and an organic phosphorus compound (hereinafter, also referred to as a component (C2) or simply as (C2)).

[Hindered Phenol Compound]

Examples of the hindered phenol compound as the component (C2) include, but are not limited to, N,N'-hexamethylenebis[3-(3,5-di-tert-butyl-4-hydroxyphenyl)propanamide], triethylene glycol-bis[3-(3-t-butyl-5-methyl-4-hydroxyphenyl) propionate, 4,4'-butylidenebis(3-methyl-6-t-butylphenol), 1,6-hexanediol-bis[3-(3,5-di-t-butyl-4-hydroxyphenyl) propionate, 2,4-bis-(n-octylthio)-6-(4-hydroxy-3,5-di-t-butylanilino)-1,3,5-triazine, pentaerythrityl-tetrakis[3-(3,5-di-t-butyl-4-hydroxyphenyl) propionate], 2,2-thio-diethylenebis[3-(3,5-di-t-butyl-4-hydroxyphenyl) propionate], octadecyl-3-(3,5-di-t-butyl-4-hydroxyphenyl) propionate, 2,2-thiobis(4-methyl-6-1-butyl-phenol), N,N'-hexamethylenebis(3,5-di-t-butyl-4-hydroxyhydrocinnamide), 3,5-di-t-butyl-4-hydroxybenzylphosphonate-diethyl ester, 1,3,5-trimethyl-2,4,6-tris (3,5-di-butyl-4-hydroxybenzyl)benzene, ethyl calcium bis (3,5-di-t-butyl-4-hydroxybenzylsulfonate), tris-(3,5-di-t-butyl-4-hydroxybenzyl)-isocyanurate, 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 2,2'-methylenebis-(4-methyl-6-t-butylphenol), 2,2'-methylene-bis-(4-ethyl-6-t-butylphenol), 4,4'-thiobis-(3-methyl-6-t-butylphenol), octylated diphenylamine, 2,4-bis[(octylthio)methyl]-o-cresol, isooctyl-3-(3,5-di-t-butyl-4-hydroxyphenyl) propionate, 4,4'-butylidenebis(3-methyl-6-t-butylphenol, 3,9-bis[1,1-dimethyl-2-[β-(3-t-butyl-4-hydroxy-5-methylphenyl)propionyloxy]ethyl]2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis-(4'-hydroxy-β-t-butylphenyl)butyric acid] glycol ester, 1,3,5-tris(3',5'-di-t-butyl-4'-hydroxybenzyl)-sec-triazine-2,4,6-(1H,3H,5H) trione, and d-α-tocopherol.

Only one of these hindered phenol compounds may be used alone, or two or more thereof may be used in combination.

[Hindered Amine Compound]

Examples of the hindered amine compound as the component (C2) include, but are not limited to, succinic acid/dimethyl-1-(2-hydroxyethyl)-4-hydroxy-2,2,6,6-tetramethylpiperidine polycondensates, poly[{6-(1,1,3,3,-tetramethylbutyl)amino-1,3,5-triazine-2,4-diyl}{(2,2,6,6,-tetramethyl-4-piperidyl)imino}hexamethylene{(2,2,6,6,-tetramethyl-4-piperidyl)imino}], bis(1,2,2,6,6-pentamethyl-4-piperidyl) 2-(3,5-di-t-butyl-4-hydroxybenzyl)-2-n-butylmalonate, tetrakis(2,2,6,6-tetramethyl-4-piperidyl)1,2,3,4-butane tetracarboxylate, bis-2,2,6,6-tetramethyl-4-piperidyl-sebacate, bis(1,2,2,6,6-pentamethyl-4-piperidyl) sebacate, methyl(1,2,2,6,6-pentamethyl-4-piperidyl) sebacate, 1-[2-[3-(3,5-di-t-butyl-4-hydroxyphenyl)propionyloxy]ethyl]-4-[3-(3,5-t-butyl-hydroxyphenyl)propionyloxy] 2,2,6,6-tetramethylpiperidine, and 4-bezoyloxy-2,2,6,6-tetramethylpiperidine.

Only one of these hindered amine compounds may be used alone, or two or more thereof may be used in combination.

[Organic Phosphorus Compound]

Examples of the organic phosphorus compound as the component (C2) include, but are not limited to, tetrakis(2,4-di-t-butylphenyl)-4,4'-biphenylene phosphonite, bis(2,6-di-t-butyl-4-methylphenyl)pentaerythritol-di-phosphite, 2,2-methylenebis(4,6-di-t-butylphenyl)octyl phosphite, triphenylphosphite, tris(2,4-di-t-butylphenyl)phosphite, diphenyl isodecyl phosphite, phenyl diisodecyl phosphite, 4,4-butylidene-bis(3-methyl-6-t-butylphenyl-di-tridecyl) phosphite, cyclic neopentanetetraylbis(octadecylphosphite), cyclic neopentanetetraylbis(2,6-di-t-butyl-4-methylphenyl) phosphite, tris(nonyl/phenyl)phosphite, diisodecyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene.

Only one of these organic heat stabilizers may be used alone as at least one organic heat stabilizer selected from the group consisting of a hindered phenol compound, a hindered amine compound, and an organic phosphorus compound, or two or more thereof may be used in combination.

Among the organic heat stabilizers listed above as the component (C2), a hindered phenol compound is preferred, and N,N'-hexamethylenebis[3-(3,5-di-tert-butyl-4-hydroxyphenyl)propanamide] is more preferred.

In the case of using the hindered phenol compound, the resulting polyamide resin composition produces better heat aging resistance.

The polyamide resin composition of the present embodiment preferably contains 0.8 to 20 parts by mass of the at least one organic heat stabilizer (C2) selected from the group consisting of a hindered phenol compound, a hindered amine compound, and an organic phosphorus compound, with respect to 100 parts by mass of the thermoplastic resins (the total of the component (A) and the component (C3)) when the component (C2) is selected as a component contained therein, from the viewpoint of heat aging resistance and productivity.

The content of the (C2) is more preferably 1 part by mass or more and 10 parts by mass or less, further preferably 1.5 parts by mass or more and 10 parts by mass or less, still further preferably 2.5 parts by mass or more and 10 parts by mass or less, still further preferably 4 parts by mass or more and 10 parts by mass or less, still further preferably 6 parts by mass or more and 10 parts by mass or less.

((C3) Crystalline Thermoplastic Resin Having Lower Melting Point than that of the Polyamide Resin (A) and/or Amorphous Thermoplastic Resin Having Lower Vicat Softening Point than that of the Polyamide Resin (A))

The polyamide resin composition of the present embodiment preferably contains (C3) a crystalline thermoplastic resin having a lower melting point than that of the polyamide resin (A) and/or an amorphous thermoplastic resin having a lower Vicat softening point than that of the polyamide resin (A) (hereinafter, also referred to as a "component (C3)").

Examples of the component (C3) include a crystalline thermoplastic resin having a lower melting point than that of the component (A) and an amorphous thermoplastic resin having a lower Vicat softening point than that of the component (A) as mentioned later, and thermoplastic elastomers.

Examples of the component (C3) include, but are not limited to, polyolefin resins such as polyethylene and polypropylene, thermoplastic polyester resins such as polyphenylene ether, polyamide resins, polylactic acid resins, polystyrene, polyvinyl chloride, acrylic resins, polycarbonate resins, polyacetal resins, and fluorine resins such as polytetrafluoroethylene.

The component (C3) is preferably a crystalline thermoplastic resin having a lower melting point than that of the component (A) from the viewpoint of initial strength. For example, a polyamide resin or a thermoplastic polyester resin is preferably used, and a polyamide resin is more preferred.

Only one of these thermoplastic resins may be used as the component (C3), or two or more thereof may be used in combination.

The content of the component (C3) in the polyamide resin composition when the component (C3) is selected as a component contained therein is preferably 1 to 50 parts by mass with respect to 100 parts by mass in total of the component (A) and the component (C3) which are thermoplastic resins. Within the aforementioned range, rigidity under high-temperature conditions can be maintained while high heat aging resistance can be exerted.

The content of the component (C3) in the polyamide resin composition is more preferably 5 parts by mass or more and 50 parts by mass or less, further preferably 10 parts by mass or more and 40 parts by mass or less, with respect to 100 parts by mass in total of the component (A) and the component (C3) from the viewpoint of the balance between high-temperature rigidity and heat aging resistance.

A polyamide resin having a melting point of lower than 240° C. is preferably used as the component (C3), and a polyamide resin having a melting point of lower than 230° C. is more preferably used, from the viewpoint of improvement in heat aging resistance.

Likewise, polyamide 6 and/or a polyamide resin in which the ratio of the number of carbon atoms to the number of nitrogen atoms (C/N) contained therein is 7 or more and 20 or less are more preferably used as the component (C3) from the viewpoint of improvement in heat aging resistance. Examples of the polyamide resin in which the ratio of the number of carbon atoms to the number of nitrogen atoms (C/N) contained therein is 7 or more and 20 or less include, but are not limited to, PA610 and PA612.

When the thermoplastic resin used as the component (C3) is amorphous, its Vicat softening point is lower than that of the aforementioned polyamide resin (A) from the viewpoint of improvement in heat aging resistance. The Vicat softening point of the component (C3) is preferably 235° C. or lower, more preferably 230° C. or lower, further preferably 220° C. or lower.

Examples of the thermoplastic polyester resin that can be used as the component (C3) include, but are not limited to, polyethylene terephthalate resins and polybutylene terephthalate resins.

The component (C3) is preferably, as mentioned above, a polyamide resin in which the ratio of the number of carbon atoms to the number of nitrogen atoms (C/N) contained in the component (C3) is 7 or more and 20 or less from the viewpoint of improvement in heat aging resistance.

The ratio of the number of carbon atoms to the number of nitrogen atoms (C/N) is preferably 7 or more and 18 or less, more preferably 8 or more and 16 or less.

The melting point of the thermoplastic resin can be measured according to JIS-K7121.

For example, Diamond DSC manufactured by PerkinElmer Inc. can be used as a measurement apparatus.

The Vicat softening point of the thermoplastic resin can be measured according to JIS-K7206.

The method for calculating the content of the component (C3) will be described.

For example, when the content of the component (A) in the polyamide resin composition is 80 kg and the content of the component (C3) therein is 20 kg, the content of the component (C3) is 20 kg with respect to 100 kg of the thermoplastic resin components (the total of the component (A) and the component (C3)). In the present specification, this is represented by containing 20 parts by mass of the component (C3) with respect to 100 parts by mass of the thermoplastic resin components (the total of the component (A) and the component (C3)).

((D) Inorganic Filler Other than Aluminic Acid Metal Salt)

The polyamide resin composition of the present embodiment preferably contains (D) an inorganic filler other than an aluminic acid metal salt (hereinafter, also referred to as an inorganic filler (D) or a component (D)).

The content of the component (D) is preferably 10 parts by mass or more and 250 parts by mass or less, more preferably 10 parts by mass or more and 150 parts by mass or less, further preferably 15 parts by mass or more and 100 parts by mass or less, with respect to 100 parts by mass of the thermoplastic resin components (the total of the component (A) and the component (C3)).

Within the aforementioned range, the polyamide resin composition of the present embodiment tends to have better fluidity and appearance characteristics.

Examples of the inorganic filler (D) other than an aluminic acid metal salt include, but are not limited to, glass fibers, carbon fibers, calcium silicate fibers, potassium titanate fibers, aluminum borate fibers, glass flakes, talc, kaolin, mica, hydrotalcite, calcium carbonate, zinc carbonate, zinc oxide, calcium monohydrogen phosphate, wollastonite, silica, zeolite, alumina, boehmite, aluminum hydroxide, titanium oxide, silicon oxide, magnesium oxide, calcium silicate, sodium aluminosilicate, magnesium silicate, ketjen black, acetylene black, farness black, carbon nanotubes, graphite, yellow copper, copper, silver, aluminum, nickel, iron, calcium fluoride, mica isinglass, montmorillonite, swellable fluorine mica, and apatite.

Among them, glass fibers having a circular or non-circular cross section, glass flakes, talc (magnesium silicate), mica, kaolin, wollastonite, titanium oxide, calcium phosphate, calcium carbonate, or calcium fluoride is preferred from the viewpoint of enhancing the strength and rigidity of the polyamide resin composition of the present embodiment.

Glass fibers, wollastonite, talc, mica, or kaolin is more preferred.

Glass fibers is further preferred.

One or more of these inorganic fillers may be used alone as the component (D), or two or more thereof may be used in combination.

The glass fibers or the carbon fibers further preferably have a number-average fiber diameter of 3 to 30 μm, a weight-average fiber length of 100 to 750 μm, and a weight-average fiber length/number-average fiber diameter aspect ratio (a value obtained by dividing the weight-average fiber length by the number-average fiber diameter) of 10 to 100 from the viewpoint that excellent mechanical characteristics can be imparted to the polyamide resin composition.

The wollastonite preferably has a number-average fiber diameter of 3 to 30 μm, a weight-average fiber length of 10 to 500 μm, and a weight-average fiber length/number-average fiber diameter aspect ratio of 3 to 100 from the viewpoint that excellent mechanical characteristics can be imparted to the polyamide resin composition of the present embodiment.

The talc, the mica, or the kaolin preferably has a number-average fiber diameter of 0.1 to 3 μm from the viewpoint that excellent mechanical characteristics can be imparted to the polyamide resin composition of the present embodiment.

In this context, the number-average fiber diameter and the weight-average fiber length described in the present specification can be determined as follow.

Specifically, the polyamide resin composition is placed in an electric furnace, and the organic matter contained therein is incinerated. For example, 100 or more filaments of the inorganic filler (D) are arbitrarily selected from the residue and observed by SEM. Their fiber diameters are measured, and an average value can be calculated to determine the number-average fiber diameter.

Also, the fiber lengths are measured using a SEM photograph taken at a magnification of ×1000, and the weight-average fiber length can be determined according to a predetermined expression (Weight-average fiber length=Σ(I=1→n)(Fiber length of the nth fiber)$^2$/Σ(I=1→n)(Fiber length of the nth fiber), wherein n represents the number of measured fibers).

The inorganic filler (D) may be surface-treated with a silane coupling agent or the like.

Examples of the silane coupling agent include, but are not limited to: aminosilanes such as γ-aminopropyltriethoxysilane, γ-aminopropyltrimethoxysilane, and N-β-(aminoethyl)-γ-aminopropylmethyldimethoxysilane; mercaptosilanes such as γ-mercaptopropyltrimethoxysilane and γ-mercaptopropyltriethoxysilane; epoxysilanes; and vinylsilanes.

Only one of these silane coupling agents may be used alone, or two or more thereof may be used in combination. Among the silane coupling agents, an aminosilane is more preferred from the viewpoint of affinity for resins.

In the case of using the glass fibers as the inorganic filler (D), the glass fibers preferably further contain a sizing agent.

The sizing agent is a component that is applied to the surface of the glass fibers.

Examples of the sizing agent include copolymers containing a carboxylic anhydride-containing unsaturated vinyl monomer and an unsaturated vinyl monomer other than the carboxylic anhydride-containing unsaturated vinyl monomer as constitutional units, epoxy compounds, polycarbodiimide compounds, polyurethane resins, acrylic acid homopolymers, copolymers of acrylic acid and an additional copolymerizable monomer, and salts thereof with primary, secondary, and tertiary amines.

Only one of these sizing agents may be used alone, or two or more thereof may be used in combination.

Among them, a copolymer containing a carboxylic anhydride-containing unsaturated vinyl monomer and an unsaturated vinyl monomer other than the carboxylic anhydride-containing unsaturated vinyl monomer as constitutional units, an epoxy compound, a polycarbodiimide compound, or a polyurethane resin, or a combination thereof is preferred, and a copolymer containing a carboxylic anhydride-containing unsaturated vinyl monomer and an unsaturated vinyl monomer other than the carboxylic anhydride-containing unsaturated vinyl monomer as constitutional units is more preferred, from the viewpoint of the mechanical strength of the polyamide resin composition of the present embodiment.

Examples of the carboxylic anhydride-containing unsaturated vinyl monomer in the copolymer containing a carboxylic anhydride-containing unsaturated vinyl monomer and an unsaturated vinyl monomer other than the carboxylic anhydride-containing unsaturated vinyl monomer as constitutional units include, but are not limited to, maleic anhydride, itaconic anhydride, and citraconic anhydride. Among them, maleic anhydride is preferred.

On the other hand, the unsaturated vinyl monomer other than the carboxylic anhydride-containing unsaturated vinyl monomer refers to an unsaturated vinyl monomer that is different from the carboxylic anhydride-containing unsaturated vinyl monomer.

Examples of the unsaturated vinyl monomer other than the carboxylic anhydride-containing unsaturated vinyl monomer include, but are not limited to, styrene, α-methylstyrene, ethylene, propylene, butadiene, isoprene, chloroprene, 2,3-dichlorobutadiene, 1,3-pentadiene, cyclooctadiene, methyl methacrylate, methyl acrylate, ethyl acrylate, and ethyl methacrylate. Among them, styrene or butadiene is preferred.

Among their combinations, one or more selected from the group consisting of a copolymer of maleic anhydride and butadiene, a copolymer of maleic anhydride and ethylene, and a copolymer of maleic anhydride and styrene, and mixtures thereof are more preferred.

The copolymer containing a carboxylic anhydride-containing unsaturated vinyl monomer and an unsaturated vinyl monomer other than the carboxylic anhydride-containing unsaturated vinyl monomer as constitutional units preferably has a weight-average molecular weight of 2,000 or higher from the viewpoint of improvement in the fluidity of the polyamide resin composition of the present embodiment. The weight-average molecular weight is more preferably 2,000 to 1,000,000. In the present specification, the weight-average molecular weight can be measured by GPC (gel permeation chromatography).

Examples of the epoxy compound include, but are not limited to: aliphatic epoxy compounds such as ethylene oxide, propylene oxide, butene oxide, pentene oxide, hexene oxide, heptene oxide, octene oxide, nonene oxide, decene oxide, undecene oxide, dodecene oxide, pentadecene oxide, and eicosene oxide; alicyclic epoxy compounds such as glycidol, epoxypentanol, 1-chloro-3,4-epoxybutane, 1-chloro-2-methyl-3,4-epoxybutane, 1,4-dichloro-2,3-epoxybutane, cyclopentene oxide, cyclohexene oxide, cycloheptene oxide, cyclooctene oxide, methylcyclohexene oxide, vinylcyclohexene oxide, and epoxidized cyclohexene methyl alcohol; terpene epoxy compounds such as pinene oxide; aromatic epoxy compounds such as styrene oxide, p-chlorostyrene oxide, and m-chlorostyrene oxide; epoxidized soybean oil; and epoxidized flaxseed oil.

The polycarbodiimide compound is a compound containing one or more carbodiimide groups (—N=C=N—), i.e., a compound obtained by the condensation of carbodiimide compounds.

The degree of condensation for the polycarbodiimide compound is preferably 1 to 20, more preferably 1 to 10. When the degree of condensation falls within the range of 1 to 20, a favorable aqueous solution or aqueous dispersion is obtained. When the degree of condensation falls within the range of 1 to 10, a more favorable aqueous solution or aqueous dispersion is obtained.

The polycarbodiimide compound is preferably a polycarbodiimide compound partially having a polyol segment. The polycarbodiimide compound partially having a polyol segment is easily solubilized and can be used more preferably as the sizing agent for the glass fibers or the carbon fibers.

The polycarbodiimide compound, i.e., the compound containing various carbodiimide groups (—N=C=N—) as described above, is obtained by the decarboxylation reaction of a diisocyanate compound in the presence of a carbodiimidization catalyst known in the art such as 3-methyl-1-phenyl-3-phospholene-1-oxide.

An aromatic diisocyanate, an aliphatic diisocyanate, or an alicyclic diisocyanate, or a mixture thereof can be used as the diisocyanate compound.

Examples of the diisocyanate compound include, but are not limited to, 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl diisocyanate, and 1,3,5-triisopropylbenzene-2,4-diisocyanate.

These diisocyanate compounds are carbodiimidized to obtain carbodiimide compounds having two isocyanate groups at their ends. Of them, dicyclohexylmethane carbodiimide can be preferably used from the viewpoint of improvement in reactivity.

Alternatively, a polycarbodiimide compound having one terminal isocyanate group is obtained by, for example, a method which involves carbodiimidizing monoisocyanate compounds in equimolar amounts or a method which involves reacting a monoisocyanate compound with a polyalkylene glycol monoalkyl ether in equimolar amounts to form an urethane bond.

Examples of the monoisocyanate compound include, but are not limited to, hexyl isocyanate, phenyl isocyanate, and cyclohexyl isocyanate.

Examples of the polyalkylene glycol monoalkyl ether include, but are not limited to, polyethylene glycol monomethyl ether and polyethylene glycol monoethyl ether.

The polyurethane resin can be any of those generally used as the sizing agent. Examples thereof include, but are not limited to, polyurethane resins synthesized from an isocyanate such as m-xylylene diisocyanate (XDI), 4,4'-methylenebis(cyclohexyl isocyanate) (HMDI), or isophorone diisocyanate (IPDI), and a polyester or polyether diol.

The acrylic acid homopolymers (polyacrylic acids) preferably have a weight-average molecular weight of 1,000 to 90,000, more preferably 1,000 to 25,000, from the viewpoint of affinity for resins.

Examples of the "additional copolymerizable monomer" constituting the copolymers of acrylic acid and an additional copolymerizable monomer include, but are not limited to, one or more selected from acrylic acid, maleic acid, methacrylic acid, vinylacetic acid, crotonic acid, isocrotonic acid, fumaric acid, itaconic acid, citraconic acid, and mesaconic acid (except for the case where the additional copolymerizable monomer is acrylic acid alone) among monomers having a hydroxy group and/or a carboxyl group.

Of these monomers, one or more ester monomers are preferably used.

The aforementioned polymer (including both of the homopolymer and the copolymer) of acrylic acid may be in the form of a salt.

Examples of the salt of the acrylic acid polymer include, but are not limited to, primary, secondary, and tertiary amines.

Specific examples thereof include triethylamine, triethanolamine, and glycine.

The degree of neutralization is set to preferably 20 to 90%, more preferably 40 to 60%, from the viewpoint of improvement in the stability of a mixed solution with other agents used in combination therewith (silane coupling agent, etc.) or reduction in amine odor.

The weight-average molecular weight of the acrylic acid polymer that forms a salt is not particularly limited and is preferably in the range of 3,000 to 50,000. The weight-average molecular weight is preferably 3,000 or higher from the viewpoint of improvement in glass fiber or carbon fiber sizing properties and is preferably 50,000 or lower from the viewpoint of improvement in the mechanical characteristics of the polyamide resin composition of the present embodiment.

Examples of the method for treating the glass fibers or the carbon fibers with various sizing agents mentioned above include a method which involves applying each of the aforementioned sizing agents to the glass fibers or the carbon fibers using a method known in the art such as a roller-type applicator in the step of producing the glass fibers or the carbon fibers known in the art, and drying the fiber strand thus produced for continuous reaction.

The fiber strand may be used directly as a roving or may be used as a chopped glass strand through a further cutting step.

The sizing agent is preferably applied (added) at a solid content corresponding to 0.2 to 3% by mass, more preferably 0.3 to 2% by mass, with respect to 100% by mass of the glass fibers or the carbon fibers. The amount of the sizing agent added is preferably 0.2% by mass or more in terms of a solid content with respect to 100% by mass of the glass fibers or the carbon fibers from the viewpoint of maintaining the bundling of the glass fibers or the carbon fibers. On the other hand, the amount of the sizing agent added is preferably 3% by mass or less from the viewpoint of improvement in the heat stability of the polyamide resin composition of the present embodiment.

The drying of the strand may be carried out after the cutting step, or the cutting step may be carried out after the drying of the strand.

(Additional Component that May be Contained in Polyamide Resin Composition)

The polyamide resin composition of the present embodiment may further contain an additional component, if necessary, without impairing the effects of the present invention in addition to the aforementioned component (A) to component (D).

Examples of the additional component include, but are not limited to, ultraviolet absorbers, light degradation inhibitors, plasticizers, lubricants, mold release agents, nucleating agents, flame retardants, colorants, staining agents, pigments, and other thermoplastic resins.

In this context, these additional components largely differ in their properties. Therefore, their preferred contents that hardly impair the effects of the present embodiment vary among these components. Those skilled in the art can readily set the respective preferred contents of these additional components.

[Method for Producing Polyamide Resin Composition]

The polyamide resin composition of the present embodiment can be produced by mixing the polyamide resin (A), the aluminic acid metal salt (B), the at least one or more compounds (C) selected from the group consisting of the following (C1) to (C3):
(C1) a salt of one or more metal elements selected from the group consisting of groups 3, 4, 11, 13, and 14 of the periodic table,
(C2) at least one organic heat stabilizer selected from the group consisting of a hindered phenol compound, a hindered amine compound, and an organic phosphorus compound, and
(C3) a crystalline thermoplastic resin having a lower melting point than that of the component (A) and/or an amorphous thermoplastic resin having a lower Vicat softening point than that of the component (A), and, if necessary, the component (C1-2) (the halide of an alkali metal and/or the halide of an alkaline earth metal), the inorganic filler (D) other than an aluminic acid metal salt, and the additional component.

In the production of the polyamide resin composition of the present embodiment, a method can be preferably used which involves kneading the aluminic acid metal salt (B) and the component (C) in a melted state of the polyamide resin (A) using a single-screw or multiple-screw extruder. Alternatively, a method can be used which involves well stirring and mixing in advance an aqueous solution of the aluminic acid metal salt (B) and pellets of the polyamide resin (A), followed by drying and removing water, supplying the polyamide resin pellets prepared by this approach and the component (C) from a feed port of an extruder, and melt-kneading the mixture.

The addition of the aluminic acid metal salt (B) is preferably carried out by a method which involves kneading the aluminic acid metal salt (B) in a melted state of the polyamide resin (A) using a single-screw or multiple-screw extruder, from the viewpoint of the dispersibility of the aluminic acid metal salt (B).

[Molded Product Comprising Polyamide Resin Composition]

The molded product of the present embodiment contains the polyamide resin composition according to the aforementioned embodiment.

The molded product of the present embodiment is obtained, for example, by the injection molding of the polyamide resin composition, without particular limitations.

The molded product according to the present embodiment can be preferably used as material parts for various uses, for example, for automobiles, for machinery industry, for electric or electronic uses, for industrial materials, for engineering materials, and for daily necessities or domestic articles, without particular limitations. The molded product according to the present embodiment is particularly preferably used as a material part for automobiles.

The molded product of the present embodiment has excellent heat aging resistance.

The present inventors have found that the addition of the aluminic acid metal salt (B), particularly, sodium aluminate, to a polyamide resin composition improves the heat aging resistance of the polyamide resin composition to the extent that the polyamide resin composition can be preferably used in a material part for automobiles.

Specifically, the present embodiment provides a polyamide resin composition, a molded product, and a material part for automobiles in which sodium aluminate has been used as an additive for improving heat aging resistance.

EXAMPLES

Hereinafter, the present invention will be described in detail with reference to specific Examples and Comparative Examples. However, the present invention is not intended to be limited by Examples below.

The following measurement methods were used for evaluating samples according to Examples and Comparative Examples.

[Measurement Method]

(Relative Viscosity in 98% Sulfuric Acid ($\eta r$))

In Examples and Comparative Examples (hereinafter, also simply referred to as "each example") mentioned later, the relative viscosity in 98% sulfuric acid ($\eta r$) of the polyamide resin (A) was measured according to JISK6920.

(Melting Point)

In Examples and Comparative Examples mentioned later, the melting point of the crystalline resin was measured as follows according to JIS-K7121 using Diamond-DSC manufactured by PerkinElmer Inc.

The measurement was carried out in a nitrogen atmosphere.

Approximately 10 mg of each sample was heated from 50° C. to 300° C. at a rate of temperature increase of 20° C./min. The endothermic peak temperature that appeared during the heating was used as the melting point.

(Vicat Softening Point)

Each test specimen of 4 mm thick was used in measurement according to ISO 306 B50 to determine the Vicat softening point (° C.).

(Terminal Group Concentration)

In Examples and Comparative Examples mentioned later, the terminal group concentrations (terminal amino group concentration and terminal carboxyl group concentration) of the polyamide resin (A) were determined by 1H-NMR measurement at 60° C. using a bisulfate solvent.

The measurement apparatus used was ECA500 manufactured by JEOL Ltd. The terminal group concentrations were calculated from the integrated values of peaks corresponding to the terminal amino groups and the terminal carboxyl groups in the polyamide resin (A) to obtain "terminal amino group concentration/terminal carboxyl group concentration".

(Initial Tensile Strength)

Pellets of the polyamide resin composition produced in each of Examples and Comparative Examples were molded into a molded piece as a multipurpose test piece (type A) according to ISO 3167 using an injection molding machine (PS-40E; manufactured by Nissei Plastic Industrial Co., Ltd.).

In this operation, the injection and pressure keeping time was set to 25 seconds, and the cooling time was set to 15 seconds.

The mold temperature and the cylinder temperature were set to the temperatures described in the production examples of the polyamide resin (A) mentioned later.

The obtained multipurpose test piece (type A) was used in the tensile test at a tensile rate of 5 mm/min according to ISO 527 to measure the initial tensile strength (MPa).

(Heat Aging Resistance)

The multipurpose test piece (type A) in the preceding paragraph (Initial tensile strength) was heat-aged by heating at 230° C. or 180° C. in a hot-air circulating oven.

After a predetermined time, the test piece was taken out of the oven, cooled at 23° C. for 24 hours or longer, and then subjected to the tensile test in the same way as the aforementioned method at a tensile rate of 5 mm/min according to ISO 527 to measure each tensile strength (MPa).

By this approach, the heating time in which the tensile strength was decreased by half (h: hour) was determined to be "strength half-life in 230° C. aging" or "strength half-life in 180° C. aging".

(Notched Charpy Impact Strength)

The multipurpose test piece (type A) in the preceding paragraph (Initial tensile strength) was cut to obtain a test piece of 80 mm in length×10 mm in width×4 mm in thickness.

This test piece was used to measure the notched Charpy impact strength ($kJ/m^2$) according to ISO 179.

(Extrudability)

Processing stability when an extruder was used in the production of the polyamide resin composition was evaluated.

Specifically, a smaller amplitude of resin temperatures, a smaller amplitude of torque values, and a more difficult-to-break extruded resin strand were evaluated in the order of results (⊚>○).

A sample for which extrusion was impossible was indicated by "not extrudable".

(Copper Deposition)

The presence or absence of copper deposition when an extruder was used in the production of the polyamide resin composition was evaluated.

Specifically, the presence or absence of copper deposition on the parts of the extruder after use in the production was evaluated as "○" when the deposition was absent and as "X" when the deposition was present.

A sample for which extrusion was impossible was indicated by "not extrudable".

(Evaluation of Color after Molding (b Value))

The b value of the multipurpose test piece (type A) in the preceding paragraph (Initial tensile strength) was measured by the reflection method using a colorimeter ZE-2000 manufactured by Nippon Denshoku Industries Co., Ltd.

(Evaluation of Color after Aging at 150° C. for 100 Hours (h) (b Value))

The multipurpose test piece (type A) in the preceding paragraph (Initial tensile strength) was heat-aged under temperature conditions of 150° C. for 100 hours in a hot-air circulating oven.

Then, the test piece was taken out of the hot-air circulating oven and cooled at 23° C. for 24 hours or longer. Then, the b value of the multipurpose test piece (type A) corresponding to each example was measured by the reflection method using a colorimeter ZE-2000 manufactured by Nippon Denshoku Industries Co., Ltd.

(Δb Value)

The difference between the b value obtained in the preceding paragraph (Evaluation of color after aging at 150° C. for 100 hours and the b value obtained in the preceding paragraph (Evaluation of color after molding) was used as the Δb value.

(Measurement of Particle Size of Aluminic Acid Metal Salt (B), and Content (% by Mass) of Particle Having Particle Size of 1 μm or Larger in Component (B))

10 g of the polyamide resin composition was dissolved in 10 mL of formic acid (manufactured by Wako Pure Chemical Industries, Ltd.).

This solution was used to measure the particle size of the aluminic acid metal salt and the content of particles having a particle size of 1 μm or larger in the component (B) using a laser diffraction particle size distribution measurement apparatus manufactured by Shimadzu Corp. (SALD-7000).

The optimum value for each metal compound was selected as a refractive index.

The refractive index was set to 1.60-1.00i for sodium aluminate.

The refractive index was set to 1.60-1.00i for magnesium aluminate.

The particle size was determined by measuring the particle size distribution based on volume using software attached to the apparatus.

The content (%) of particles having a particle size of 1 μm or larger in the aluminic acid metal salt (B) was calculated according to [Integrated value (%) of relative particle amounts of particles having a particle size of 1 μm or larger×100/Integrated value (%) of relative particle amounts of the whole system].

(Calcium Chloride Resistance)

The multipurpose test piece (type A) in the preceding paragraph (Initial tensile strength) was dipped in hot water of 80° C. for 60 minutes, then dipped in water of 23° C. for 15 minutes, and subsequently left at 23° C. in a 50% RH atmosphere for 30 minutes. This was used as a sample.

This sample was mounted with its center as a support on a stainless steel round bar having a diameter of 7 mm, and 500 g of lead was suspended from both ends of the sample.

Subsequently, gauze having a width of 3 cm was placed on this support portion and impregnated with 2 mL of a 30% aqueous calcium chloride solution. This sample was left for 2 hours in an oven kept at 100° C.

During this operation, the gauze was replenished with 2 mL of a 30% aqueous calcium chloride solution every 30 minutes.

Next, the loads were removed, and the sample was washed with water and then dried. The presence or absence of cracks was observed under a microscope and evaluated according to the following criteria:

○: No cracks or two or less small cracks were found.

X 5 to 9 cracks were found.

[Starting Material]

The following starting materials were used in Examples and Comparative Examples.

((A) Polyamide Resin)

<Polyamide Resin A-I (PA66)>

30 kg of an aqueous solution of equimolar salts of 50% by mass of hexamethylenediamine and adipic acid was prepared and sufficiently stirred.

The aqueous solution of the starting materials for polyamide 66 (hereinafter, also simply referred to as an aqueous solution of the starting materials) was charged into a 70 L autoclave having a stirring apparatus and a discharge nozzle in a lower area.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The reaction product was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of <polyamide resin A-I> was 2.8.

The terminal amino group concentration was 46 μmol/g, and the terminal carboxyl group concentration was 72 μmol/g.

Specifically, terminal amino group concentration/terminal carboxyl group concentration was 0.64.

The melting point was 264° C., and the Vicat softening point was 238° C.

The mold temperature and the cylinder temperature were set to 80° C. and 290° C., respectively, for molding the polyamide resin composition using <polyamide resin A-I>.

<Polyamide Resin A-II (PA66)>

Additional 900 g of adipic acid was added to the aqueous solution of the starting materials.

Other conditions were set in the same way as in the method for producing <polyamide resin A-I> to produce <polyamide resin A-II>.

The relative viscosity in 98% sulfuric acid of <polyamide resin A-II> was 2.2.

The terminal amino group concentration was 33 μmol/g, and the terminal carboxyl group concentration was 107 μmol/g.

Specifically, terminal amino group concentration/terminal carboxyl group concentration was 0.3.

The melting point was 264° C., and the Vicat softening point was 238° C.

The mold temperature and the cylinder temperature were set to 80° C. and 290° C., respectively, for molding the polyamide resin composition using <polyamide resin A-II>.

<Polyamide Resin A-III (PA66)>

Additional 900 g of hexamethylenediamine was added to the aqueous solution of the starting materials.

Other conditions were set in the same way as in the method for producing <polyamide resin A-I> to produce <polyamide resin A-III>.

The relative viscosity in 98% sulfuric acid of <polyamide resin A-III> was 2.4.

The terminal amino group concentration was 78 μmol/g, and the terminal carboxyl group concentration was 52 μmol/g. Specifically, terminal amino group concentration/terminal carboxyl group concentration was 1.5.

The melting point was 264° C., and the Vicat softening point was 238° C.

The mold temperature and the cylinder temperature were set to 80° C. and 290° C., respectively, for molding the polyamide resin composition using <polyamide resin A-III>.

<Polyamide Resin A-IV (PA66/6T)>

<Polyamide resin A-IV (PA66/6T)> was produced according to the production example of National Publication of International Patent Application No. 2013-501094.

The relative viscosity in 98% sulfuric acid of <polyamide resin A-IV> was 2.9.

The terminal amino group concentration was 42 μmol/g, and the terminal carboxyl group concentration was 65 μmol/g. Specifically, terminal amino group concentration/terminal carboxyl group concentration was 0.6.

The mold temperature and the cylinder temperature were set to 80° C. and 290° C., respectively, for molding the polyamide resin composition using <polyamide resin A-IV>.

<Polyamide Resin A-V (PA9T)>

<Polyamide resin A-V (PA9T)> was produced according to the production example of Japanese Patent Laid-Open No. 2013-40346.

The relative viscosity in 98% sulfuric acid of <polyamide resin A-V> was 2.9, and the melting point was 304° C.

The terminal amino group concentration was 42 μmol/g, and the terminal carboxyl group concentration was 52 μmol/g. Specifically, terminal amino group concentration/terminal carboxyl group concentration was 0.8.

The mold temperature and the cylinder temperature were set to 120° C. and 330° C., respectively, for molding the polyamide resin composition using <polyamide resin A-V>.

((B) Aluminic Acid Metal Salt)

<Sodium Aluminate B-I>

Sodium aluminate manufactured by Wako Pure Chemical Industries, Ltd. was used.

(Component (C1))

<C1-I: Copper Iodide>

A reagent manufactured by Wako Pure Chemical Industries, Ltd. was used.

<C1-II: Copper Acetate>

A reagent manufactured by Wako Pure Chemical Industries, Ltd. was used.

(Component (C1-2))

<C1-2-I: Potassium Iodide>

A reagent manufactured by Wako Pure Chemical Industries, Ltd. was used.

<C1-2-II: Potassium Bromide>

A reagent manufactured by Wako Pure Chemical Industries, Ltd. was used.

(Component (C2))

<C2-I: Hindered Phenol Compound>

IRGANOX 1098 manufactured by BASF Japan Ltd. was used.

<C2-II: Hindered Amine Compound>

NYLOSTAB S-EED manufactured by Clariant (Japan) K.K. was used.

<C2-III: Organic Phosphorus Compound>

IRGAFOS 168 manufactured by BASF Japan Ltd. was used.

((C3) Crystalline Thermoplastic Resin Having Lower Melting Point than that of Polyamide Resin (A) and/or Amorphous Thermoplastic Resin Having Lower Vicat Softening Point than that of Polyamide Resin (A))

<Thermoplastic Resin C3-I (PA66)>

The same as <polyamide resin A-I (PA66)> mentioned above was used.

<Thermoplastic Resin C3-II (PA6)>

SF1013A manufactured by Ube Industries, Ltd. was used. The melting point was 224° C.

<Thermoplastic Resin C3-III (PA610)>

<Thermoplastic resin C3-III (PA610)> was produced according to the production example of Japanese Patent Laid-Open No. 2011-148997.

The relative viscosity in 98% sulfuric acid of <thermoplastic resin C3-III> was 2.3, and the melting point was 215° C.

The terminal amino group concentration was 58 μmol/g, and the terminal carboxyl group concentration was 79 μmol/g. Specifically, terminal amino group concentration/terminal carboxyl group concentration was 0.7.

<Thermoplastic Resin C3-IV (PBT)>

"Toraycon" 1401 X06 manufactured by Toray Industries, Inc. was used. The melting point was 224° C.

<Thermoplastic Resin C3-V (PC)>

"Panlite" L-1225Y manufactured by Teijin Ltd. was used. The Vicat softening point was 148° C.

((D) Inorganic Filler Other than Aluminic Acid Metal Salt)

<Glass Fibers D-I>

The total mass was adjusted to 100% by mass by dilution with water such that, based on solid contents, a polyurethane resin was 2% by mass (trade name: Bondic® 1050, manufactured by DIC Corp.)), an ethylene-maleic anhydride copolymer (manufactured by Wako Pure Chemical Industries, Ltd.) was 8% by mass, γ-aminopropyltriethoxysilane was 0.6% by mass (trade name: KBE-903, (manufactured by Shin-Etsu Chemical Co., Ltd.)), and a lubricant was 0.1% by mass (trade name: Carnauba wax (manufactured by S. Kato & Co.)) to obtain a glass fiber sizing agent.

The glass fiber sizing agent was attached to melt-spun glass fibers having a number-average fiber diameter of 10 μm.

Specifically, the glass fiber sizing agent was applied to the glass fibers on their way to be taken up on a rotating drum using an applicator located at a predetermined position. Subsequently, this was dried to obtain a roving of a glass fiber bundle surface-treated with the glass fiber sizing agent (glass roving). The bundle involved 1,000 glass fibers.

The amount of the glass fiber sizing agent attached was 0.6% by mass. This roving was cut into a length of 3 mm to obtain a chopped glass strand. This chopped strand was used as <glass fibers D-I>.

<Glass Fibers D-II>

No ethylene-maleic anhydride copolymer was used. Other conditions were set in the same way as in the glass fibers (D-I). The prepared glass fibers were used as glass fibers (D-II).

Example 1

The extruder used was a twin-screw extruder (ZSK-26MC; manufactured by Coperion GmbH (Germany)).

This twin-screw extruder has an upstream feed port in the first barrel on the upstream side and has a downstream feed port in the 9th barrel. Its L/D (Length of the cylinder of the extruder/Diameter of the cylinder of the extruder) was 48 (the number of barrels: 12).

In this twin-screw extruder, the temperature from the upstream feed port to the die was set to the cylinder temperature described in each item of ((A) Polyamide resin) described above.

The number of screw rotations was set to 300 rpm, and the discharge rate was set to 25 kg/hr.

Under these conditions, the component (A), the component (B), and the component (C) were supplied from the upstream feed port, while the component (D) was supplied from the downstream feed port so as to attain the ratios described in the upper boxes of Table 1 below. The mixture was melt-kneaded to produce pellets of a polyamide resin composition.

The obtained polyamide resin composition was molded, and the molded piece was used to evaluate heat aging resistance, initial tensile strength, and notched Charpy impact strength.

These evaluation results, etc., are shown in Table 1 below.

Examples 2 to 35 and 39 to 84 and Comparative Examples 1 to 16

According to the composition described in Tables 1 to 11, other conditions were set in the same way as in Example 1 to produce each polyamide resin composition, which was then molded. The molded piece was used to carry out various measurements.

These measurement results, etc., are shown in Tables 1 to 11 below.

Example 36

The number of screw rotations was set to 150 rpm.

Other conditions were set in the same way as in Example 1 to produce a polyamide resin composition, which was then molded. The molded piece was used to measure heat aging resistance, initial tensile elongation, b value after molding, b value after aging at 150° C. for 100 hours, notched Charpy impact strength, and the content of aluminic acid metal salt particles having a particle size of 1 μm or larger in the aluminic acid metal salt. These measurement results are shown in Table 5 below.

Example 37

30 kg of an aqueous solution of equimolar salts of 50-% by mass of hexamethylenediamine and adipic acid was prepared and sufficiently stirred.

The aqueous solution of the starting materials for polyamide 66 was charged into a 70 L autoclave having a stirring apparatus and a discharge nozzle in a lower area.

Subsequently, sodium aluminate was added at 0.5 parts by mass with respect to 100 parts by mass of the polyamide resin.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The reaction product was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of the resin was 2.8. The terminal amino group concentration was 46 μmol/g, and the terminal carboxyl group concentration was 72 μmol/g.

Specifically, terminal amino group concentration/terminal carboxyl group concentration was 0.64.

100 parts by mass of the polyamide resin, 0.5 parts by mass of the sodium aluminate (B-I), and 2 parts by mass of the IRGNOX 1098 (C2-I) were supplied from the upstream feed port, while 50 parts by mass of the glass fibers (D-I)

were supplied from the downstream feed port. The mixture was melt-kneaded to produce pellets of a polyamide resin composition.

The obtained polyamide resin composition was molded, and its molded piece was used to measure heat aging resistance, initial tensile elongation, notched Charpy impact strength, and the content of aluminic acid metal salt particles having a particle size of 1 μm or larger in the aluminic acid metal salt. These measurement results are shown in Table 5 below.

Example 38

30 kg of an aqueous solution of equimolar salts of 50% by mass of hexamethylenediamine and adipic acid was prepared and sufficiently stirred.

The aqueous solution of the starting materials for polyamide 66 was charged into a 70 L autoclave having a stirring apparatus and a discharge nozzle in a lower area.

Subsequently, sodium aluminate was added at 1 part by mass with respect to 100 parts by mass of the polyamide resin.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The reaction product was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of the resin was 2.8. The terminal amino group concentration was 46 μmol/g, and the terminal carboxyl group concentration was 72 μmol/g. Specifically, terminal amino group concentration/terminal carboxyl group concentration was 0.64.

100 parts by mass of the polyamide resin and 2 parts by mass of the IRGNOX 1098 (C2-I) were supplied from the upstream feed port, while 50 parts by mass of the glass fibers (D-I) were supplied from the downstream feed port. The mixture was melt-kneaded to produce pellets of a polyamide resin composition.

The obtained polyamide resin composition was molded, and its molded piece was used to measure heat aging resistance, initial tensile elongation, notched Charpy impact strength, and the content of aluminic acid metal salt particles having a particle size of 1 μm or larger in the aluminic acid metal salt. These measurement results are shown in Table 5 below.

TABLE 1

| | | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| Polyamide resin A-I | [parts by mass] | 100 | 100 | 100 | 100 | 100 | 100 | 100 | 100 | 100 | 100 |
| Sodium aluminate B-I | [parts by mass] | 0.06 | 0.3 | 0.6 | 0.9 | 0.9 | 0.9 | 1.2 | 1.5 | 0 | 0.015 |
| Copper iodide C1-1 | [parts by mass] | 0.03 | 0.03 | 0.03 | 0.03 | 0.03 | 0.03 | 0.03 | 0.03 | 0.03 | 0.03 |
| Potassium iodide C1-2-I | [parts by mass] | 1 | 1 | 1 | 1 | — | 1 | 1 | 1 | 1 | 1 |
| Potassium bromide C1-2-II | [parts by mass] | — | — | — | — | 1 | — | — | — | — | — |
| Glass fibers D-I | [parts by mass] | 50 | 50 | 50 | 50 | 50 | — | 50 | 50 | 50 | 50 |
| Glass fibers D-II | [parts by mass] | — | — | — | — | — | 50 | — | — | — | — |
| Heat aging resistance (strength half-life at 230° C.) | [h] | 800 | 1000 | 1400 | 1600 | 1500 | 1200 | 1700 | 1700 | 200 | 400 |
| Heat aging resistance (strength half-life at 180° C.) | [h] | 1700 | 1900 | 2100 | 2200 | 2200 | — | 2300 | 2400 | 1100 | 1400 |
| Initial tensile strength | [MPa] | 200 | 200 | 200 | 200 | 200 | — | 195 | 190 | 200 | 200 |
| Notched Charpy impact strength | [kJ/m2] | — | — | — | 12 | 10 | — | — | — | — | — |

TABLE 2

| | | Example 9 | Example 10 | Example 11 | Example 12 | Example 13 | Example 14 | Example 15 | Comparative Example 3 | Comparative Example 4 | Example 16 | Example 17 |
|---|---|---|---|---|---|---|---|---|---|---|---|---|
| Polyamide resin A-I | [parts by mass] | 100 | 100 | 100 | 100 | 100 | 100 | 100 | 100 | 100 | 100 | 100 |
| Sodium aluminate B-I | [parts by mass] | 0.06 | 0.3 | 0.6 | 0.9 | 0.9 | 1.2 | 1.5 | 0 | 0.015 | 0.9 | 0.9 |
| Copper iodide C1-I | [parts by mass] | 0.03 | 0.03 | 0.03 | 0.03 | — | 0.03 | 0.03 | 0.03 | 0.03 | 0.03 | 0.03 |

TABLE 2-continued

|  |  | Example 9 | Example 10 | Example 11 | Example 12 | Example 13 | Example 14 | Example 15 | Comparative Example 3 | Comparative Example 4 | Example 16 | Example 17 |
|---|---|---|---|---|---|---|---|---|---|---|---|---|
| Copper acetate C1-II | [parts by mass] | — | — | — | — | 0.03 | — | — | — | — | — | — |
| Potassium iodide C1-2-I | [parts by mass] | 0.3 | 0.3 | 0.3 | 0.3 | 0.3 | 0.3 | 0.3 | 0.3 | 0.3 | 0.3 | 0.3 |
| Glass fibers D-I | [parts by mass] | 50 | 50 | 50 | 50 | 50 | 50 | 50 | 50 | 50 | 100 | 33 |
| Heat aging resistance (strength half-life at 230° C.) | [h] | 800 | 1050 | 1500 | 1700 | 1600 | 1800 | 1900 | 200 | 400 | 1800 | 1650 |
| Heat aging resistance (strength half-life at 180° C.) | [h] | 1800 | 2000 | 2200 | 2400 | 2400 | 2500 | 2600 | 1200 | 1450 | 2450 | 2300 |
| Initial tensile strength | [MPa] | 200 | 200 | 200 | 200 | 200 | 195 | 190 | 200 | 200 | 250 | 185 |

TABLE 3

|  |  | Example 18 | Example 19 | Example 20 | Comparative Example 5 | Comparative Example 6 | Example 21 | Example 22 | Example 23 | Comparative Example 7 | Example 24 | Comparative Example 8 |
|---|---|---|---|---|---|---|---|---|---|---|---|---|
| Polyamide resin A-I | [parts by mass] | 100 | 100 | 100 | 100 | 100 | 100 | 100 | 100 | 100 | 100 | 100 |
| Sodium aluminate B-I | [parts by mass] | 3 | 6 | 10 | 50 | 1 | 1 | 1 | 1 | 1 | 0.06 | 0.017 |
| Copper iodide C1-I | [parts by mass] | 0.03 | 0.03 | 0.03 | 0.03 | 0 | 0.003 | 0.009 | 0.09 | 0.3 | 0.0057 | 0.0057 |
| Potassium iodide C1-2-I | [parts by mass] | 0.3 | 0.3 | 0.3 | 0.3 | 0 | 0.03 | 0.3 | 0.9 | 3 | 0.057 | 0.057 |
| Glass fibers D-I | [parts by mass] | 50 | 50 | 50 | 50 | 50 | 50 | 50 | 50 | 50 | 50 | 50 |
| Heat aging resistance (strength half-life at 230° C.) | [h] | 2400 | ≥3000 | 2800 | not extrudable | 1200 | 1400 | 1700 | 1900 | 1000 | 800 | 500 |
| Heat aging resistance (strength half-life at 180° C.) | [h] | 2400 | ≥3000 | ≥3000 | not extrudable | 800 | 1600 | 2000 | 2400 | 800 | 1600 | 1500 |
| Extrudability |  | ◎ | ○ | ○ | not extrudable | ○ | ○ | ○ | ○ | ○ | ○ | ○ |
| Copper deposition |  | ○ | ○ | ○ | not extrudable | ○ | ○ | ○ | ○ | X | ○ | ○ |

TABLE 4

|  |  | Example 4 | Example 25 | Example 26 | Example 27 | Example 28 |
|---|---|---|---|---|---|---|
| Polyamide resin A-I |  | 100 | — | — | — | — |
| Polyamide resin A-II | [parts by mass] | — | 100 | — | — | — |
| Polyamide resin A-III | [parts by mass] | — | — | 100 | — | — |
| Polyamide resin A-IV | [parts by mass] | — | — | — | 100 | — |
| Polyamide resin A-V | [parts by mass] | — | — | — | — | 100 |
| Sodium aluminate B-I | [parts by mass] | 0.9 | 0.9 | 0.9 | 0.9 | 0.9 |
| Copper iodide C1-I | [parts by mass] | 0.03 | 0.03 | 0.03 | 0.03 | 0.03 |
| Potassium iodide C1-2-I | [parts by mass] | 1 | 1 | 1 | 1 | 1 |
| Glass fibers D-I | [parts by mass] | 50 | 50 | 50 | 50 | 50 |
| Heat aging resistance (strength half-life at 230° C.) | [h] | 1600 | 1600 | 1600 | 1300 | 1500 |

TABLE 5

| | | Example 29 | Example 30 | Example 31 | Example 32 | Example 33 | Example 34 | Example 35 | Example 36 | Example 37 | Example 38 |
|---|---|---|---|---|---|---|---|---|---|---|---|
| Polyamide resin A-I | [parts by mass] | 100 | 100 | 100 | 100 | 100 | 100 | 100 | 100 | 100 | 100 |
| Sodium aluminate B-I | [parts by mass] | 0.05 | 0.2 | 0.4 | 0.6 | 1 | 1 | 1 | 1 | 1 | 1 |
| Hindered phenol compound C2-I | [parts by mass] | 2 | 2 | 2 | 2 | 0.8 | 1.2 | 2 | 2 | 2 | 2 |
| Hindered amine compound C2-II | [parts by mass] | — | — | — | — | — | — | — | — | — | — |
| Organic phosphorus compound C2-III | [parts by mass] | — | — | — | — | — | — | — | — | — | — |
| Glass fibers D-I | [parts by mass] | 50 | 50 | 50 | 50 | 50 | 50 | 50 | 50 | 50 | 50 |
| Glass fibers D-II | [parts by mass] | — | — | — | — | — | — | — | — | — | — |
| Heat aging resistance (strength half-life at 230° C.) | [h] | 900 | 1100 | 1100 | 1200 | 1300 | 1300 | 1300 | 1200 | 1100 | 800 |
| Heat aging resistance (strength half-life at 180° C.) | [h] | 1200 | 1300 | 1400 | 1500 | 1200 | 1200 | 1600 | — | — | — |
| Initial tensile elongation | [%] | — | — | — | — | — | — | 5 | 4 | 2 | 1 |
| b value after molding | | 1 | 1 | −1 | −1 | −1 | −1 | −1 | — | — | — |
| b value after aging at 150° C. for 100 h | | 6 | 5 | 3 | 3 | 5 | 3 | 2 | — | — | — |
| Δb | | 5 | 4 | 4 | 4 | 6 | 4 | 3 | — | — | — |
| Notched Charpy impact strength | [kJ/m2] | — | — | — | — | — | — | 14 | 11 | 10 | 9 |
| Content of aluminic acid metal salt particles having particle size of 1 μm or larger in total mass of aluminic acid metal salt | [% by mass] | — | — | — | — | — | — | 3 | 9 | 14 | 22 |

TABLE 6

| | | Example 39 | Example 40 | Example 41 | Example 42 | Example 43 | Example 44 | Example 45 | Comparative Example 9 | Comparative Example 10 |
|---|---|---|---|---|---|---|---|---|---|---|
| Polyamide resin A-I | [parts by mass] | 100 | 100 | 100 | 100 | 100 | 100 | 100 | 100 | 100 |
| Sodium aluminate B-I | [parts by mass] | 1 | 1 | 1 | 1 | 1 | 1 | 1 | 0 | 1 |
| Hindered phenol compound C2-I | [parts by mass] | 3 | 5 | 7 | 2 | 2 | — | — | 2 | 0.5 |
| Hindered amine compound C2-II | [parts by mass] | — | — | — | — | — | 2 | — | — | — |
| Organic phosphorus compound C2-III | [parts by mass] | — | — | — | — | — | — | 2 | — | — |
| Glass fibers D-I | [parts by mass] | 50 | 50 | 50 | — | — | 50 | 50 | 50 | 50 |
| Glass fibers D-II | [parts by mass] | — | — | — | — | 50 | — | — | — | — |
| Heat aging resistance (strength half-life at 230° C.) | [h] | 1300 | 1300 | 1300 | 1000 | 1300 | 1200 | 1200 | 100 | 1200 |
| Heat aging resistance (strength half-life at 180° C.) | [h] | 1650 | 1700 | 1800 | — | — | — | — | 300 | 900 |
| Initial tensile elongation | [%] | — | — | — | — | — | — | — | — | — |
| b value after molding | | 1 | 2 | 3 | −1 | −1 | — | — | 3 | −1 |
| b value after aging at 150° C. for 100 h | | 4 | 4 | 4 | 2 | 2 | — | — | 10 | 5 |
| Δb | | 3 | 2 | 1 | 3 | 3 | — | — | 7 | 6 |
| Notched Charpy impact strength | [kJ/m2] | — | — | — | — | 11 | — | — | — | — |
| Content of aluminic acid metal salt particles having particle size of 1 μm or larger in total mass of aluminic acid metal salt | [% by mass] | — | — | — | — | — | — | — | — | — |

TABLE 7

| | | Example 46 | Example 47 | Example 48 | Example 49 | Comparative Example 11 | Example 50 | Comparative Example 12 | Comparative Example 13 |
|---|---|---|---|---|---|---|---|---|---|
| Polyamide resin A-I | [parts by mass] | 100 | 100 | 100 | 100 | 100 | 100 | 100 | 100 |
| Sodium aluminate B-I | [parts by mass] | 2 | 3 | 5 | 10 | 50 | 1 | 1 | 0.02 |
| Hindered phenol compound C2-I | [parts by mass] | 2 | 2 | 2 | 2 | 2 | 10 | 30 | 2 |

TABLE 7-continued

|  |  | Example 46 | Example 47 | Example 48 | Example 49 | Comparative Example 11 | Example 50 | Comparative Example 12 | Comparative Example 13 |
|---|---|---|---|---|---|---|---|---|---|
| Glass fibers D-I | [parts by mass] | 50 | 50 | 50 | 50 | 50 | 50 | 50 | 50 |
| Heat aging resistance (strength half-life at 230° C.) | [h] | 1500 | 1700 | 2000 | 2000 | not extrudable | 1300 | not extrudable | 400 |
| Heat aging resistance (strength half-life at 180° C.) | [h] | 1600 | 1700 | 1800 | 1800 | not extrudable | 1600 | not extrudable | 600 |
| Initial tensile elongation | [%] | 5 | 4 | 3 | 1 | — | — | — | — |
| b value after molding |  | −1 | −1 | −1 | −1 | — | 4 | — | — |
| b value after aging at 150° C. for 100 h |  | 2 | 2 | 1 | 1 | — | 5 | — | — |
| Δb |  | 4 | 4 | 3 | 3 | — | 1 | — | — |

TABLE 8

|  |  | Example 34 | Example 51 | Example 52 | Example 53 | Example 54 |
|---|---|---|---|---|---|---|
| Polyamide resin A-I | [parts by mass] | 100 | — | — | — | — |
| Polyamide resin A-II | [parts by mass] | — | 100 | — | — | — |
| Polyamide resin A-III | [parts by mass] | — | — | 100 | — | — |
| Polyamide resin A-IV | [parts by mass] | — | — | — | 100 | — |
| Polyamide resin A-V | [parts by mass] | — | — | — | — | 100 |
| Sodium aluminate B-I | [parts by mass] | 1 | 1 | 1 | 1 | 1 |
| Hindered phenol compound C2-I | [parts by mass] | 2 | 2 | 2 | 2 | 2 |
| Glass fibers D-I | [parts by mass] | 50 | 50 | 50 | 50 | 50 |
| Heat aging resistance (strength half-life at 230° C.) | [h] | 1300 | 1300 | 1300 | 1300 | 1300 |
| b value after molding |  | −1 | −1 | −1 | 2 | 3 |
| b value after aging at 150° C. for 100 h |  | 2 | 2 | 2 | 5 | 6 |
| Δb value |  | 3 | 3 | 3 | 3 | 3 |

TABLE 9

|  |  | Comparative Example 6 | Example 55 | Example 56 | Example 57 | Example 58 | Example 59 | Example 60 | Example 61 | Example 62 | Example 63 | Example 64 | Example 65 | Example 66 |
|---|---|---|---|---|---|---|---|---|---|---|---|---|---|---|
| Polyamide resin A-I | [parts by mass] | 100 | 95 | 90 | 80 | 60 | 50 | 95 | 90 | 80 | 60 | 50 | 80 | 90 |
| Polyamide resin A-VI | [parts by mass] | — | — | — | — | — | — | — | — | — | — | — | — | — |
| Thermoplastic resin C3-I | [parts by mass] | — | — | — | — | — | — | — | — | — | — | — | — | — |
| Thermoplastic resin C3-II | [parts by mass] | — | 5 | 10 | 20 | 40 | 50 | — | — | — | — | — | — | — |
| Thermoplastic resin C3-III | [parts by mass] | — | — | — | — | — | — | 5 | 10 | 20 | 40 | 50 | — | — |
| Thermoplastic resin C3-IV | [parts by mass] | — | — | — | — | — | — | — | — | — | — | — | 20 | — |
| Thermoplastic resin C3-V | [parts by mass] | — | — | — | — | — | — | — | — | — | — | — | — | 10 |
| Sodium aluminate B-I | [parts by mass] | 1 | 1 | 1 | 1 | 1 | 1 | 1 | 1 | 1 | 1 | 1 | 1 | 1 |
| Glass fibers D-I | [parts by mass] | 50 | 50 | 50 | 50 | 50 | 50 | 50 | 50 | 50 | 50 | 50 | 50 | 50 |
| Initial tensile strength | [MPa] | — | 210 | 210 | 200 | — | — | 210 | 200 | 195 | — | — | — | 170 |
| Heat aging resistance (strength half-life at 230° C.) | [h] | 1200 | 1500 | 1700 | 2000 | 2000 | 1900 | 1500 | 1700 | 2000 | 2000 | 1900 | 1900 | 1600 |
| Heat aging resistance (strength half-life at 180° C.) | [h] | 800 | 1300 | 1600 | 1800 | 1800 | 1800 | 1300 | 1600 | 1800 | 1800 | 1800 | 1700 | 1400 |

TABLE 9-continued

|  | Comparative Example 6 | Example 55 | Example 56 | Example 57 | Example 58 | Example 59 | Example 60 | Example 61 | Example 62 | Example 63 | Example 64 | Example 65 | Example 66 |
|---|---|---|---|---|---|---|---|---|---|---|---|---|---|
| Calcium chloride resistance | — | — | — | x | — | — | — | — | ○ | — | — | — | — |

TABLE 10

|  |  | Example 67 | Comparative Example 14 | Comparative Example 15 | Example 68 | Example 69 | Example 70 | Example 71 | Example 72 | Example 73 | Example 74 | Example 75 | Example 76 | Comparative Example 16 |
|---|---|---|---|---|---|---|---|---|---|---|---|---|---|---|
| Polyamide resin A-I | [parts by mass] | — | 100 | 80 | 80 | 80 | 80 | 80 | 80 | 80 | 80 | 80 | 80 | 80 |
| Polyamide resin A-VI | [parts by mass] | 80 | — | — | — | — | — | — | — | — | — | — | — | — |
| Thermoplastic resin C3-I | [parts by mass] | 20 | — | — | — | — | — | — | — | — | — | — | — | — |
| Thermoplastic resin C3-II | [parts by mass] | — | — | 20 | 20 | 20 | 20 | 20 | 20 | 20 | 20 | 20 | 20 | 20 |
| Thermoplastic resin C3-III | [parts by mass] | — | — | — | — | — | — | — | — | — | — | — | — | — |
| Thermoplastic resin C3-IV | [parts by mass] | — | — | — | — | — | — | — | — | — | — | — | — | — |
| Thermoplastic resin C3-V | [parts by mass] | — | — | — | — | — | — | — | — | — | — | — | — | — |
| Sodium aluminate B-I | [parts by mass] | 1 | 1 | 0.02 | 0.06 | 0.3 | 0.6 | 0.8 | 1 | 1.2 | 1.5 | 3 | 5 | 50 |
| Glass fibers D-I | [parts by mass] | 50 | 50 | 50 | 50 | 50 | 50 | 50 | 50 | 50 | 50 | 50 | 50 | 50 |
| Initial tensile strength | [MPa] | — | — | — | — | — | — | — | — | — | — | — | — | — |
| Heat aging resistance (strength half-life at 230° C.) | [h] | 2200 | 1200 | 400 | 900 | 1300 | 1600 | 1800 | 2000 | 2100 | 2200 | 2300 | 2000 | not extrudable |
| Heat aging resistance (strength half-life at 180° C.) | [h] | 1600 | 800 | 1000 | 1200 | 1300 | 1500 | 1700 | 1800 | 1900 | 2000 | 2100 | 1800 | not extrudable |
| Calcium chloride resistance |  | — | — | — | — | — | — | — | — | — | — | — | — | — |

TABLE 11

|  |  | Example 77 | Example 78 | Example 79 | Example 80 | Example 81 | Example 82 | Example 83 | Example 84 |
|---|---|---|---|---|---|---|---|---|---|
| Polyamide resin A-I | [parts by mass] | 95 | 90 | 80 | 80 | 100 | 100 | 90 | 80 |
| Sodium aluminate B-I | [parts by mass] | 1 | 1 | 1 | 1 | 1 | 1 | 1 | 1 |
| Copper iodide C1-I | [parts by mass] | 0.03 | 0.03 | 0.03 | 0.03 | 0.03 | 0.03 | — | — |
| Potassium iodide C1-2-I | [parts by mass] | 0.3 | 0.3 | 0.3 | 0.3 | 0.3 | 0.3 | — | — |
| Hindered phenol compound C2-I | [parts by mass] | — | — | — | — | 1 | 3 | 1 | 1 |
| Thermoplastic resin C3-II | [parts by mass] | 5 | 10 | 20 | — | — | — | 10 | 20 |
| Thermoplastic resin C3-III | [parts by mass] | — | — | — | 20 | — | — | — | — |
| Glass fibers D-I | [parts by mass] | 50 | 50 | 50 | 50 | 50 | 50 | 50 | 50 |
| Heat aging resistance (strength half-life at 230° C.) | [h] | 2000 | 2500 | ≥3000 | ≥3000 | 1700 | 1750 | 1800 | 2000 |

TABLE 11-continued

|  |  | Example 77 | Example 78 | Example 79 | Example 80 | Example 81 | Example 82 | Example 83 | Example 84 |
|---|---|---|---|---|---|---|---|---|---|
| Heat aging resistance (strength half-life at 180° C.) | [h] | 2200 | 2300 | ≥3000 | ≥3000 | 2600 | 2650 | 1800 | 1900 |
| Initial tensile strength | [MPa] | — | — | 200 | 195 | — | — | — | — |
| b value after molding |  | — | — | — | — | 2 | 1 | — | — |
| b value after aging at 150° C. for 100 h |  | — | — | — | — | 4 | 3 | — | — |
| Δb |  | — | — | — | — | 2 | 2 | — | — |
| Calcium chloride resistance |  | — | — | x | ○ | — | — | — | — |

In Tables 1 to 11, "-" means that the measurement was not carried out.

Tables 1 to 11 demonstrated that the polyamide resin compositions of Examples 1 to 84 exhibit excellent heat aging resistance.

On the other hand, Comparative Examples 1 to 16 were inferior in heat aging resistance to Examples.

The present application is based on Japanese Patent Application No. 2013-202041 filed on Sep. 27, 2013 with the Japan Patent Office, Japanese Patent Application No. 2013-218533 filed on Oct. 21, 2013 with the Japan Patent Office, and Japanese Patent Application No. 2014-169802 filed on Aug. 22, 2014 with the Japan Patent Office, the entire contents of which are incorporated herein by reference.

INDUSTRIAL APPLICABILITY

The polyamide resin composition of the present invention is industrially applicable as materials for various parts, for example, for automobiles, for machinery industry, for electric or electronic uses, for industrial materials, for engineering materials, and for daily necessities or domestic articles.

The invention claimed is:

1. A polyamide resin composition comprising:
   (A) a polyamide resin;
   (B) one or more aluminic acid metal salts selected from the group consisting of lithium aluminate, sodium aluminate, potassium aluminate, beryllium aluminate, magnesium aluminate, and calcium aluminate; and
   (C) one or more compounds selected from the group consisting of the following (C1) to (C3):
      (C1) a salt of one or more metal elements selected from the group consisting of groups 3, 4, 11, 13, and 14 of a periodic table;
      (C2) at least one organic heat stabilizer selected from the group consisting of a hindered phenol compound, a hindered amine compound, and an organic phosphorus compound; and
      (C3) a crystalline thermoplastic resin having a lower melting point than that of the component (A) and/or an amorphous thermoplastic resin having a lower Vicat softening point than that of the component (A), and
   wherein a content of the component (B) is 0.5 to 20 parts by mass with respect to 100 parts by mass in total of the component (A) and the component (C3), and
   the components (C1) to (C3) have the following respective contents when selected as a component contained therein:
      component (C1): 0.001 to 0.05 parts by mass in terms of an amount of the metal element;
      component (C2): 0.8 to 20 parts by mass; and
      component (C3): 1 to 50 parts by mass.

2. The polyamide resin composition according to claim 1, wherein the compound (C) is a combination of at least two or more selected from the group consisting of the components (C1) to (C3).

3. The polyamide resin composition according to claim 1, wherein the polyamide resin (A) is a polyamide resin having a melting point of 240° C. or higher.

4. The polyamide resin composition according to claim 1, wherein the polyamide resin (A) is polyamide 66.

5. The polyamide resin composition according to claim 1, wherein the aluminic acid metal salt (B) is sodium aluminate.

6. The polyamide resin composition according to claim 1, further comprising (D) an inorganic filler other than the aluminic acid metal salt.

7. The polyamide resin composition according to claim 6, wherein a content of the component (D) is 10 to 250 parts by mass with respect to 100 parts by mass in total of the component (A) and the component (C3).

8. The polyamide resin composition according to claim 1, wherein the component (C) comprises at least the component (C1).

9. The polyamide resin composition according to claim 1, wherein the component (C1) is a copper salt.

10. The polyamide resin composition according to claim 1, wherein the component (C1) is a copper halide and/or copper acetate.

11. The polyamide resin composition according to claim 1, wherein a mass ratio (B)/(C1) of the component (B) to the component (C1) is 1 or more.

12. The polyamide resin composition according to claim 8, further comprising (C1-2) a halide of an alkali metal and/or a halide of an alkaline earth metal.

13. The polyamide resin composition according to claim 12, wherein a molar ratio of a halogen element of the component (C1-2) to the metal element of the component (C1) (halogen element/metal element) is 2 to 50.

14. The polyamide resin composition according to claim 1, wherein the component (C) comprises at least the component (C2).

15. The polyamide resin composition according to claim 1, wherein the component (C2) is a hindered phenol compound.

16. The polyamide resin composition according to claim 1, wherein the component (C) comprises at least the component (C3).

17. The polyamide resin composition according to claim 1, wherein the component (C3) is a polyamide resin having a melting point of lower than 240° C.

18. The polyamide resin composition according to claim 1, wherein the component (C3) is polyamide 6.

19. The polyamide resin composition according to claim 1, wherein the component (C3) is a polyamide resin in which a ratio of number of carbon atoms to number of nitrogen atoms (C/N) contained in the component (C3) is 7 or more and 20 or less.

20. A molded product comprising a polyamide resin composition according to claim 1.

* * * * *